(12) United States Patent
Li et al.

(10) Patent No.: US 9,704,430 B2
(45) Date of Patent: Jul. 11, 2017

(54) LED DISPLAY DEVICE AND METHOD FOR OPERATING THE SAME

(71) Applicant: SCT TECHNOLOGY, LTD., Grand Cayman (KY)

(72) Inventors: Eric Li, Milpitas, CA (US); Juinn-Yan Chen, Milpitas, CA (US); Shean-Yih Chiou, Milpitas, CA (US); Shang-Kuan Tang, Milpitas, CA (US)

(73) Assignee: SCT TECHNOLOGY, LTD., Grand Cayman (KY)

( * ) Notice: Subject to any disclaimer, the term of this patent is extended or adjusted under 35 U.S.C. 154(b) by 0 days.

(21) Appl. No.: 15/370,712

(22) Filed: Dec. 6, 2016

(65) Prior Publication Data

US 2017/0084223 A1 Mar. 23, 2017

Related U.S. Application Data

(63) Continuation-in-part of application No. 14/798,034, filed on Jul. 13, 2015.

(51) Int. Cl.
*G09G 3/32* (2016.01)
*G09G 5/00* (2006.01)
*G09G 3/3208* (2016.01)
*G09G 5/393* (2006.01)
*G09G 5/395* (2006.01)

(52) U.S. Cl.
CPC ............. *G09G 3/32* (2013.01); *G09G 3/3208* (2013.01); *G09G 5/006* (2013.01); *G09G 5/393* (2013.01); *G09G 5/395* (2013.01); *G09G 2300/026* (2013.01); *G09G 2352/00* (2013.01); *G09G 2370/02* (2013.01); *G09G 2370/04* (2013.01); *G09G 2370/042* (2013.01); *G09G 2370/10* (2013.01); *G09G 2370/14* (2013.01)

(58) Field of Classification Search
None
See application file for complete search history.

(56) References Cited

U.S. PATENT DOCUMENTS

| | | | | |
|---|---|---|---|---|
| 2002/0163513 A1* | 11/2002 | Tsuji | ..................... | G06F 3/1446 345/204 |
| 2003/0038771 A1* | 2/2003 | Sunohara | ............. | G09G 3/3688 345/103 |
| 2009/0316718 A1* | 12/2009 | Traeber | ............. | H04L 12/40136 370/463 |
| 2010/0202132 A1* | 8/2010 | Kishimoto | ......... | H05B 41/2822 362/97.1 |
| 2014/0055476 A1* | 2/2014 | Wang | ..................... | G09G 5/003 345/547 |

* cited by examiner

*Primary Examiner* — Joni Richer
(74) *Attorney, Agent, or Firm* — Novick, Kim & Lee, PLLC; Allen Xue

(57) ABSTRACT

This disclosure describes an LED display device. The LED display device includes a transmitter, a plurality of first receivers coupled to the transmitter, a plurality of second receiver modules, wherein each of the second receiver modules is coupled to at least one of the first receivers and comprises a plurality of second receivers, a plurality of LED driver groups, each of the LED driver groups coupled to at least one of the second receivers and having a plurality of LED drivers, and a transformerless wire link connecting the plurality of first receivers to the plurality of second receiver modules, or the transformerless wire link connecting adjacent receivers of the plurality of second receivers therebetween.

18 Claims, 18 Drawing Sheets

LED DISPLAY DEVICE AND METHOD FOR OPERATING THE SAME

UTILITY PATENT APPLICATION

This application is a continuation-in-part application and claims benefit of U.S. non-provisional application Ser. No. 14/798,034, filed on Jul. 13, 2015, the disclosures of which are hereby incorporated by reference.

FIELD OF THE DISCLOSURE

This disclosure relates generally to an LED display device and a method for operating the same. In particular, this disclosure relates to an LED display device and a method using a transformerless wire link.

BACKGROUND OF THE DISCLOSURE

Light emitting diode (LED) is widely used for displaying information and messages. LED is a solid-state device that converts electric energy to light. LED display panels provide a higher level of brightness and greater optical efficiency as compared to other types of display panels. Recently, LED display panels have been used to make large indoor or outdoor display panels and televisions.

The design, fabrication, and operation of a large LED display panel face numerous technical challenges. For example, the size of an LED display panel can be as large as around 7.35 m×4.1 m. With such large display panels, it becomes difficult to send a set of data to designated LED drivers across the LED display panels in a synchronous manner. The set of data can include configuration control bits and pulse-code modulation (PCM) data. Such data control the brightness, color depth, and on-and-off of the LED display.

FIG. 1A is a schematic block diagram of an LED system 1 having a plurality of receiver cards 13, each of the receiver cards 13 being connected to a plurality of LED drivers 14. Referring to FIG. 1, the LED system 1 includes a video source 10, a SendBox 12, a plurality of receiver cards 13, and a plurality of LED drivers 14. To transmit a set of data to a designated set of LED drivers 14, the LED system 1 requires the SendBox 12 and the plurality of receiver cards 13. Depending on the configuration of the LED system, the total number of receiver cards 13 may vary. A receiver card 13 receives data from the SendBox 12 via a gigabit Ethernet port 11. A set of LED drivers 14 have access to a serially arranged set of plurality of receiver cards 13 to read the data. Each set of LED drivers 14 corresponds to a receiver card 13. Thus, as the number of LED drivers 14 grows, the number of gigabit Ethernet ports 11 designated to the plurality of receiver cards 13 increases.

FIG. 1B is a schematic block diagram of a receiver card 13a connected to another receiver card 13b and the two receiver cards connected to a set of LED drivers 14a and 14b, respectively. The diagram is an enlargement of two receiver cards 13 and the connected set of LED drivers 14 shown in FIG. 1A. It is a close-up depiction of two linked receiver cards. All other receiver cards in a serially arranged plurality of receiver cards are configured in the manner showing in FIG. 1B. The two receiver cards are connected via a GigaPHY (hereafter "GPHY") link which requires gigabit Ethernet ports and transformers on both the sending and the receiving end of the receiver cards. As the number of receiver cards grows, the number of GPHY links between the receiver cards increases. Furthermore, each of the receiver cards requires a memory for pixel mapping. Referring to FIG. 1B, a receiver card 13a is realized by a field-programmable gate array (FPGA) device with on-board frame buffer for pixel mapping and buffer usage. GPHY 11 and transformer 11a are configured for a link. A large-scale array of LED driver chip using GPHY technology requires a heavy volume of pins.

FIG. 2 is a schematic block diagram of an LED system 1'. Referring to FIG. 2, LED system 1' includes a video processor 10, a transmitter 11, a receiver card 13, and a plurality of LED drivers 14. The receiver card 13 receives data from the transmitter 11 via a GPHY link. After receiving data designated thereto, the receiver card 13 distributes the received data to the plurality of LED drivers 14 attached thereto. Such data distribution necessitates pixel mapping to ensure that the initially transmitted data is received and reconstructed in desired order to display the final image from the video source on the LED display panel.

A large number of receiver cards and ports may present some problems. First, the receiver cards use transformer components 11a either in a transmitter port or a receiving port. The physical size of the transformer put a limit on the size of an ultrathin LED display panel. Second, a large number of transformers used as high frequency signal coupling devices in the port causes problematic electromagnetic radiation, such as electromagnetic interference (EMI). Third, a large number of receiver cards require a larger number of switching DC-DC converters, which are not only hard to integrate into the LED main display board but also create EMI. Further, a plurality of receiver cards and gigabit Ethernet ports attached thereto reside in an LED display panel and therefore increase the size of display. In addition, a large number of gigabit Ethernet ports and links significantly increase production costs of LED display panels. Accordingly, a display device, a method for transmitting data packet, and a light-emitting diode (LED) system that overcome the above described shortcomings are needed.

SUMMARY OF THE DISCLOSURE

In view of the aforementioned problems, the present disclosure provides an LED display device and a method for operating the LED display device. An LED display device is provided according to an embodiment of the present disclosure. An LED display device includes a transmitter, a plurality of first receivers coupled to the transmitter, a plurality of second receiver modules, wherein each of the second receiver modules is coupled to at least one of the first receivers and comprises a plurality of second receivers, a plurality of LED driver groups, each of the LED driver groups coupled to at least one of the second receivers and comprising a plurality of LED drivers, and a transformerless wire link connecting the plurality of first receivers to the plurality of second receiver modules, or the transformerless wire link connecting adjacent receivers of the plurality of second receivers therebetween.

The transformerless wire link may be a serializer/deserializer (SerDes) link. The transformerless wire link does not include a transformer. Each of the plurality of second receivers includes a phase-locked loop (PLL). Each of the plurality of second receivers does not include a transformer. A distance between the plurality of first receivers and the plurality of second receiver modules is less than 4 m. A distance between the adjacent receivers of the plurality of second receivers is less than 4 m. The transmitter is connected to the plurality of first receivers via a Gigabit Ethernet PHY (GPHY).

According to another embodiment of the present disclosure, a method of operating a LED display device is provided. The method includes transmitting data from a transmitter to a plurality of first receivers, transmitting the data from the plurality of first receivers to a plurality of second receiver modules via a transformerless wire link, wherein each of the second receiver modules is coupled to at least one of the first receivers and comprises a plurality of second receivers, and wherein the transformerless wire link connects the plurality of first receivers to the plurality of second receiver modules or the transformerless wire link connects adjacent receivers of the plurality of second receivers therebetween, and transmitting the data from the plurality of second receiver modules to a plurality of LED driver groups, each of the LED driver groups coupled to at least one of the second receivers and comprising a plurality of LED drivers.

The transformerless wire link may be a serializer/deserializer (SerDes) link. The transformerless wire link does not include a transformer. Each of the plurality of second receivers includes a phase-locked loop (PLL). Each of the plurality of second receivers does not include a transformer.

A distance between the plurality of first receivers and the plurality of second receiver modules is less than 4 m. A distance between the adjacent receivers of the plurality of second receivers is less than 4 m. The transmitter is connected to the plurality of first receivers via a Gigabit Ethernet PHY (GPHY).

DETAILED DESCRIPTION OF THE PREFERRED EMBODIMENT

Figure 1A:
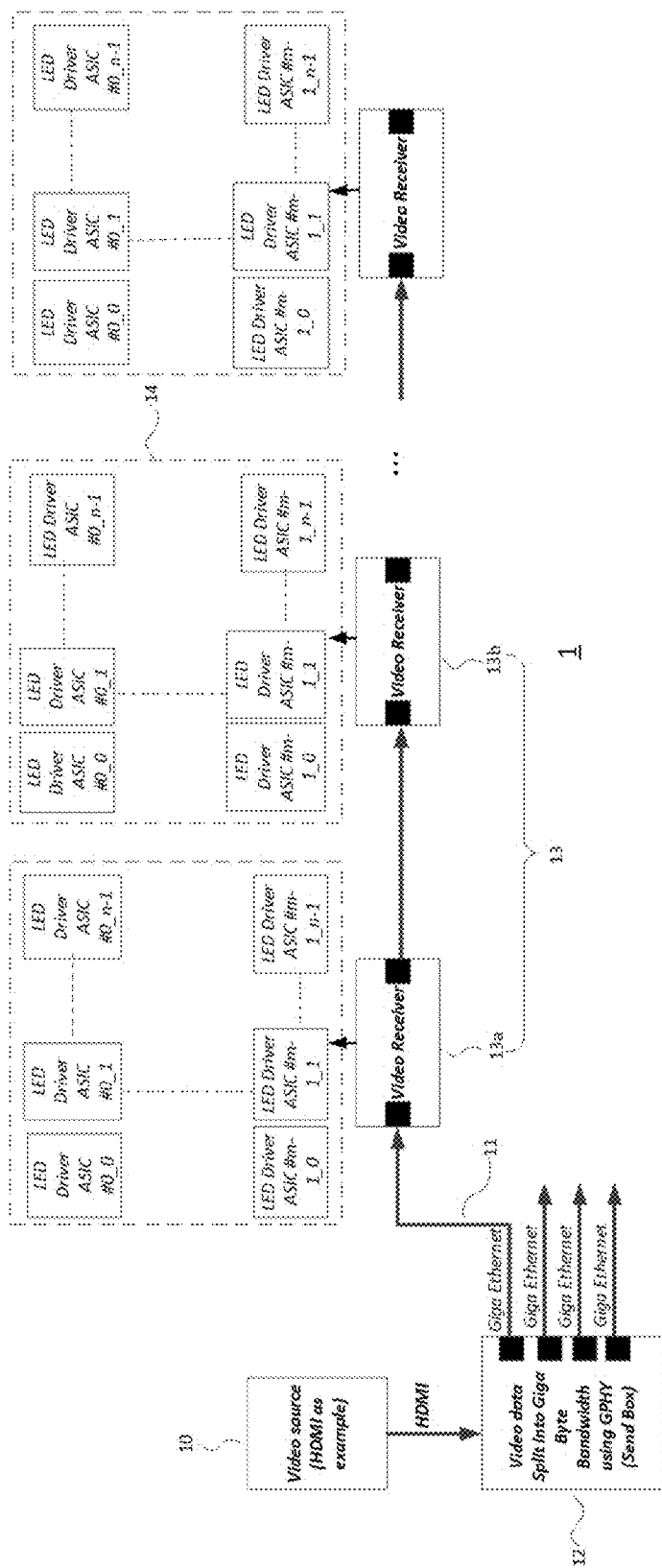
FIG. 1A is a schematic block diagram of an LED system having a plurality of receiver cards, each of the receiver cards being connected to a plurality of LED drivers.

Reference will now be made in detail to embodiments, examples of which are illustrated in the accompanying drawings, wherein like reference numerals refer to the like elements throughout the several views. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the disclosure. The terms "comprises" and/or "comprising" are used to specify the presence of stated elements, steps, operations, and/or components, but do not preclude the presence or addition of one or more other elements, steps, operations, and/or components. The terms "first," "second," and the like may be used to describe various elements, but do not limit the elements. Such terms are only used to distinguish one element from another. These and/or other aspects become apparent and are more readily appreciated by those of ordinary skill in the art from the following description of embodiments of the present disclosure, taken in conjunction with the accompanying drawings. The figures depict embodiments of the present disclosure for purposes of illustration only. One skilled in the art will readily recognize from the following description that alternative embodiments of the structures and methods illustrated herein may be employed without departing from the principles of the disclosure described herein.

Figure 3:
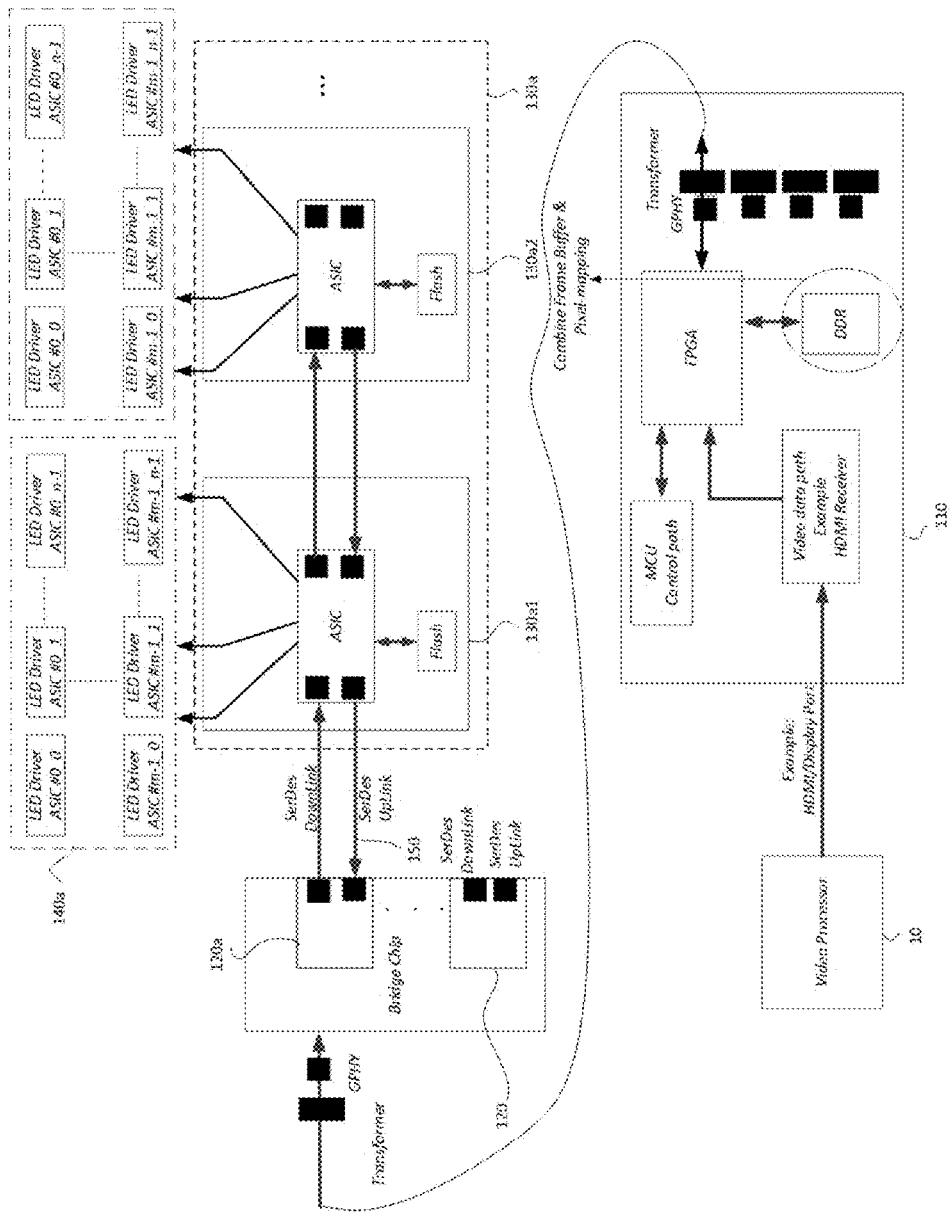
FIG. 3 is a schematic block diagram showing a configuration of an LED system.
Figure 4:
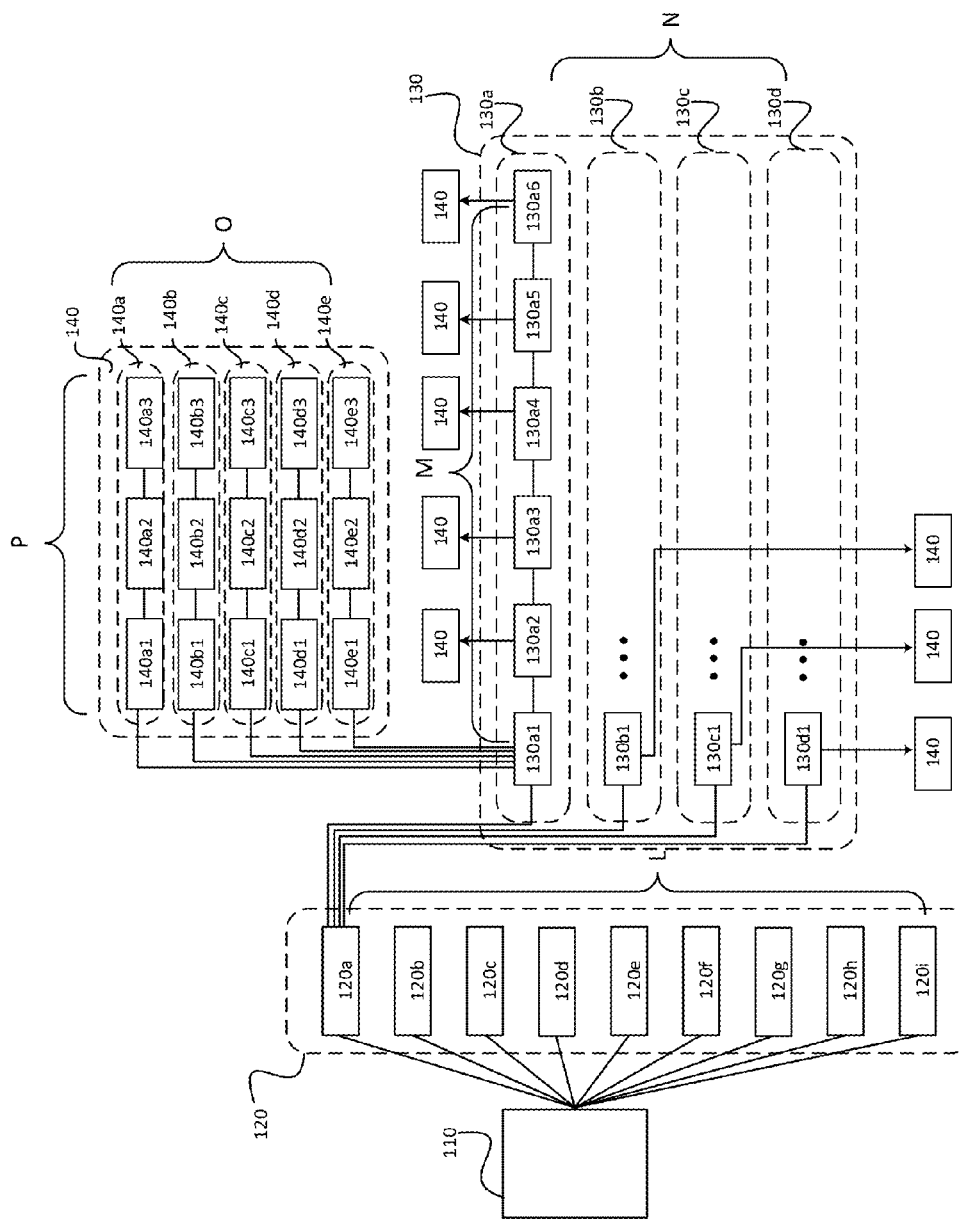
FIG. 4 is a schematic block diagram showing a hierarchical configuration of the LED system according to the embodiment of the present disclosure.
Figure 5:
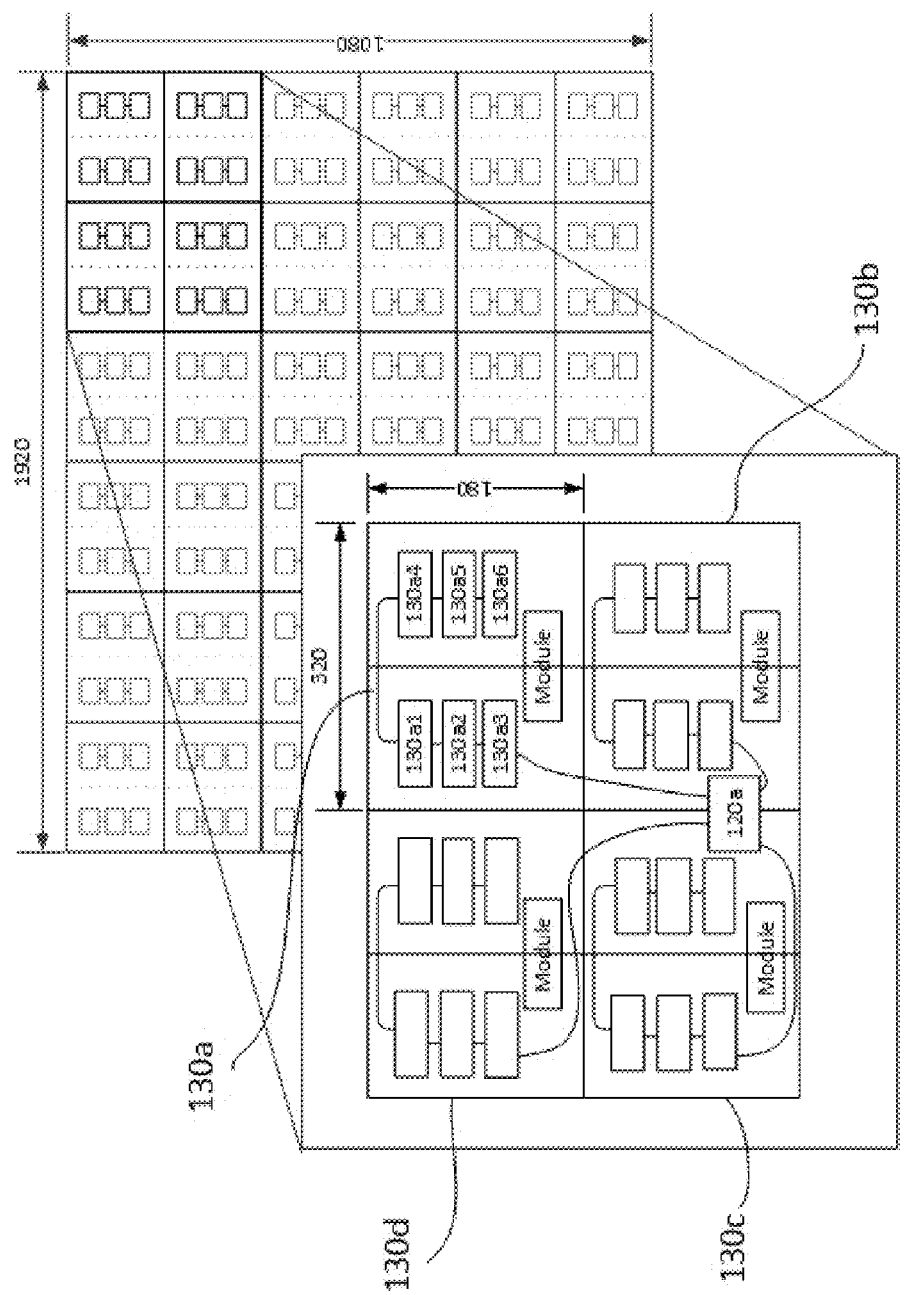
FIG. 5 is a schematic block diagram showing first and second receivers shown in FIG. 4 arranged in the LED display panel according to the embodiment of the present disclosure.
Figure 6:
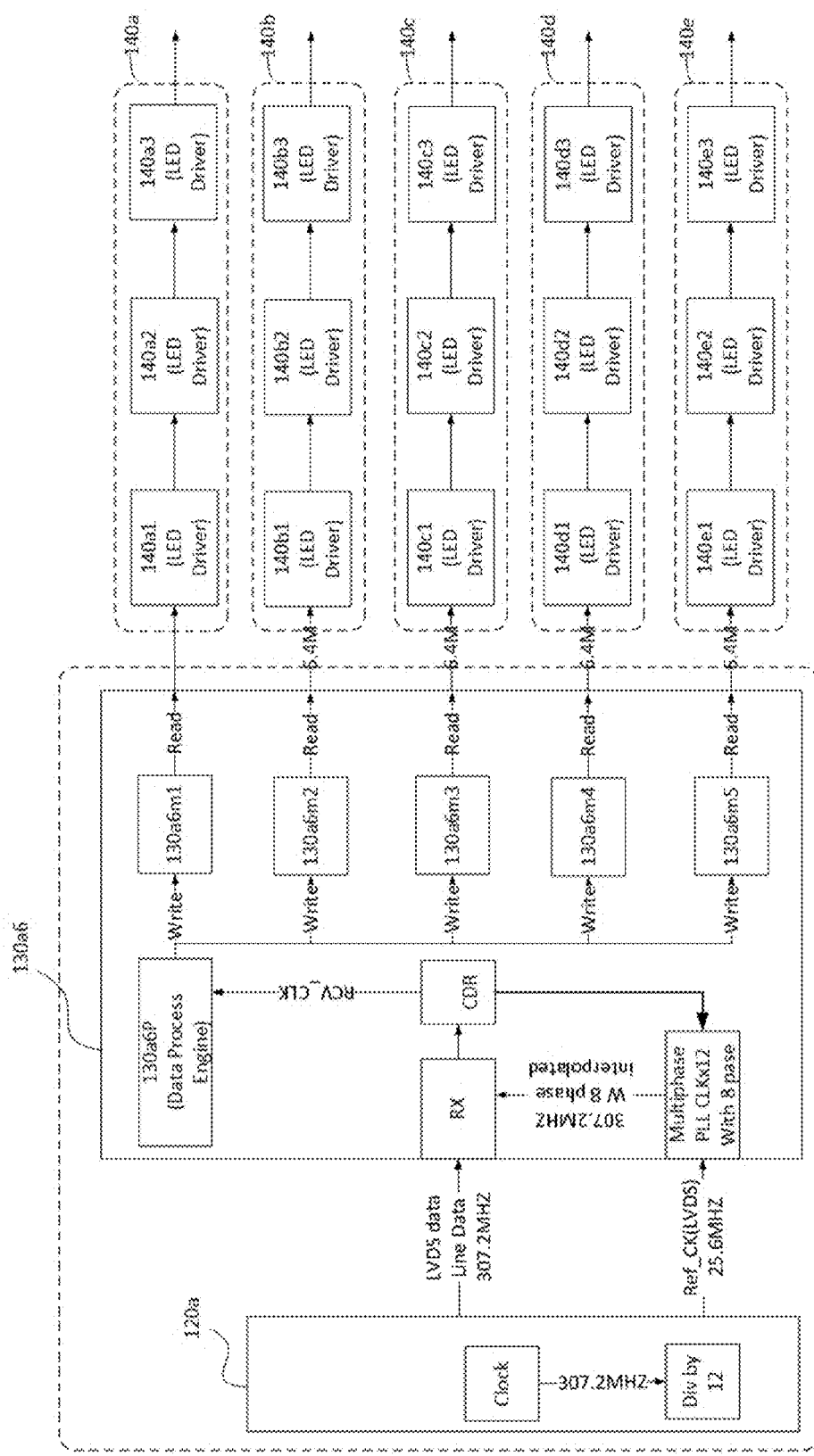
FIG. 6 is a detailed schematic block diagram illustrating one set of the first and second receivers, and their connections to a plurality of LED drivers according to the embodiment of the present disclosure.
Figure 7:
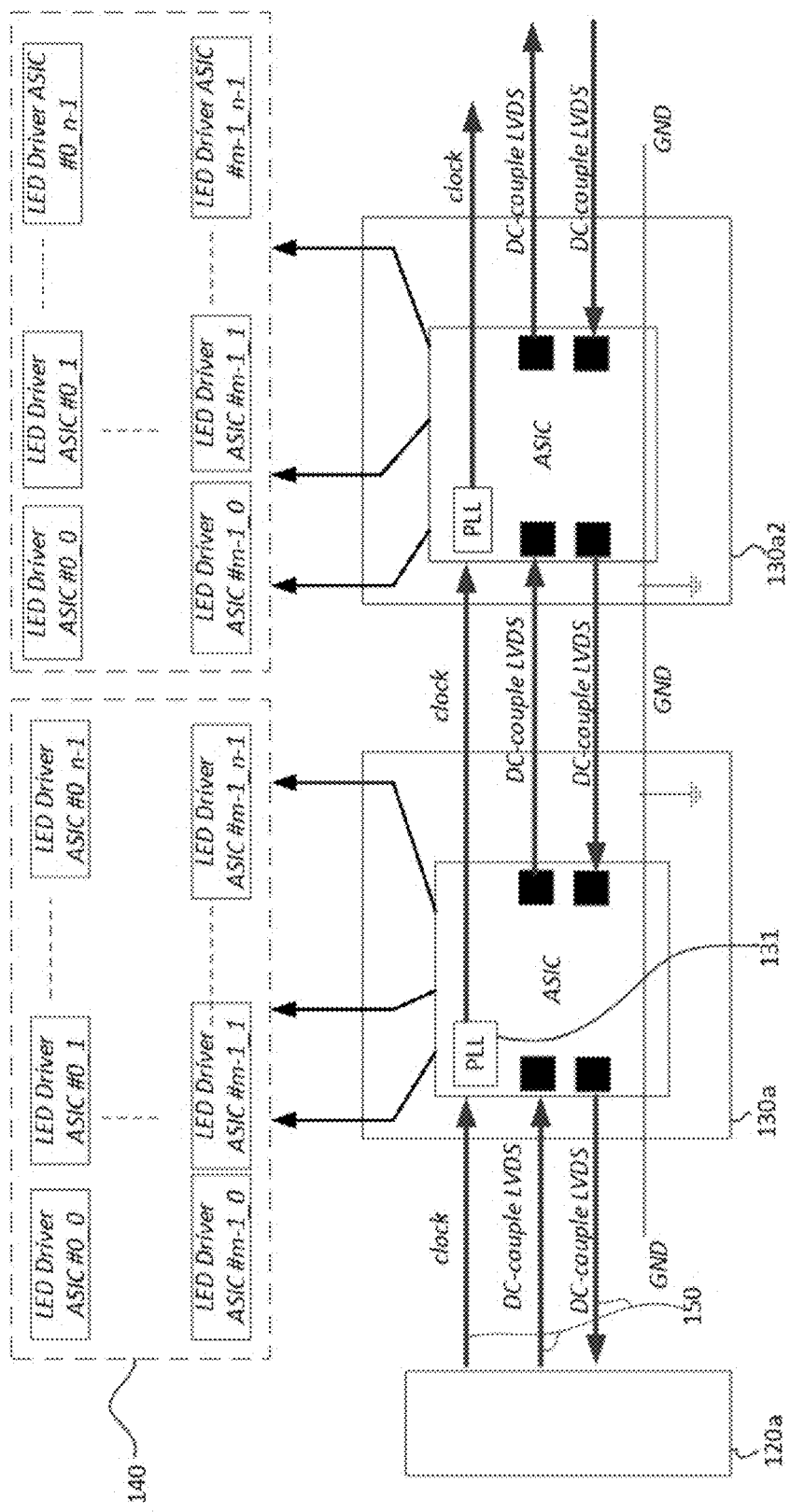
FIG. 7 is a schematic block diagram of adjacent first receivers connected serially via a transformerless wire link and plurality of LED drivers connected to each of the first receivers.
Figure 8:
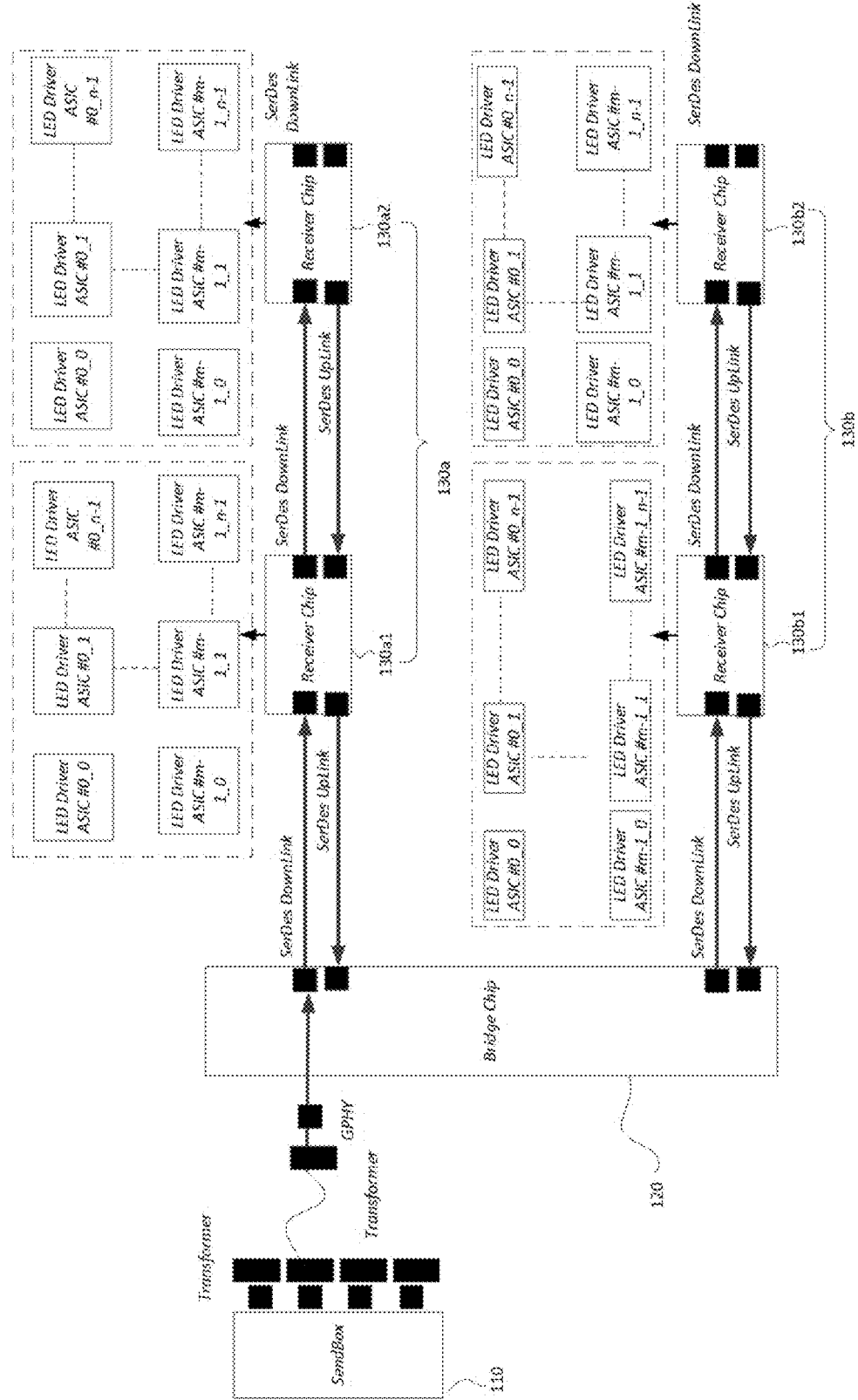
FIG. 8 is a schematic block diagram of two second receivers connected serially via a transformerless wire link and a plurality of LED drivers connected to each of the first receivers.

An embodiment of the present disclosure is described with reference to FIGS. 3-8. FIG. 3 is a schematic block diagram showing a configuration of an LED system 100. FIG. 4 is a schematic block diagram showing a hierarchical configuration of the LED system 100 according to the embodiment of the present disclosure. FIG. 5 is a schematic block diagram showing first and second receivers shown in FIG. 4 arranged in the LED display panel according to the embodiment of the present disclosure. FIG. 6 is a detailed schematic block diagram illustrating one set of the first and second receivers 120a and 130a6, and their connections to a plurality of LED drivers 140a, 140b, 140c, 140d, and 140e according to the embodiment of the present disclosure. FIG. 7 is a schematic block diagram of adjacent first receivers 130a1 and 130a2 connected serially via a transformerless wire link 150 and plurality of LED drivers 140 connected to each of the first receivers 130a1 and 130a2. FIG. 8 is a schematic block diagram of two second receivers 130a1 and 130a2 connected serially via a transformerless wire link 150 and a plurality of LED drivers 140a connected to each of the second receivers 130.

LED system 100 includes a transmitter 110, a plurality of first receivers 120, a plurality of second receivers 130, a plurality of LED drivers 140, and a plurality of transformerless electrical wires 150. According to the embodiment of the present disclosure, LED system 100 has a compact structure because the plurality of transformerless electrical wires 150 enable the connects of the plurality of first receivers 120 and the plurality of second receivers 130 without transformers.

For the purpose of simplicity, unless otherwise indicated herein, reference numeral 120 refers to a plural number of first receivers while a specific first receiver is designated as the reference numeral 120 followed by an alphabet, e.g., 120a. Likewise, reference numeral 130 refers to a plural number of second receivers. A second receiver module containing a plural number of second receivers is referred to as the reference numeral 130 followed by an alphabet, e.g., 130a. A specific second receiver is referred to as the reference numeral 130 followed by an alphabet plus a number, e.g., 130a1. Likewise, reference numeral 140 refers to a plural number of LED drivers while a specific LED driver is referred to as the reference numeral 140 followed by an alphabet plus a number, e.g., 140a1. AN LED driver group containing a plural number of LED drivers is referred to as 140a.

Figure 1B:
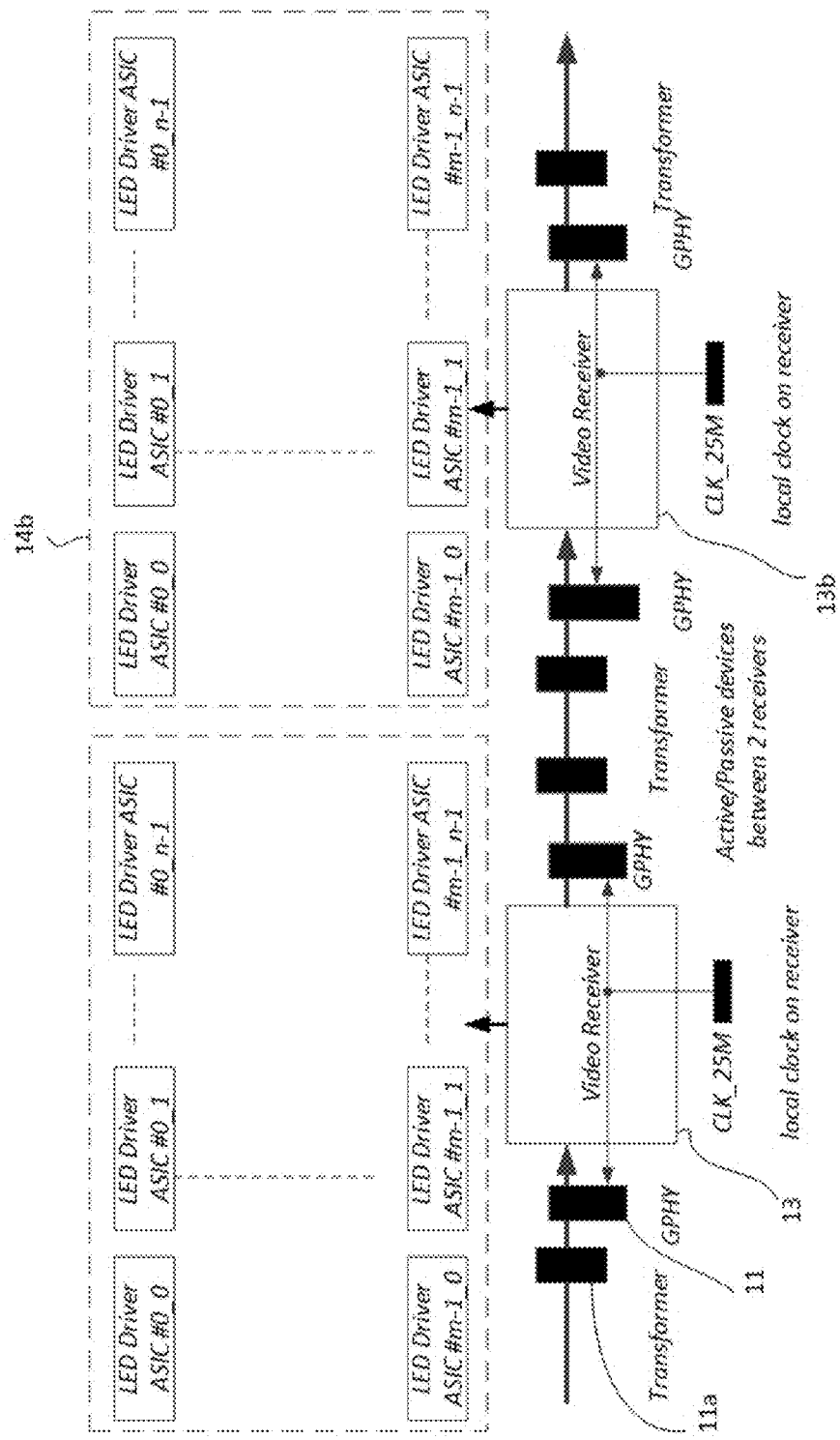
FIG. 1B is a schematic block diagram showing a receiver card connected to another receiver card. Each receiver card is connected to a set of LED drivers.
Figure 2:
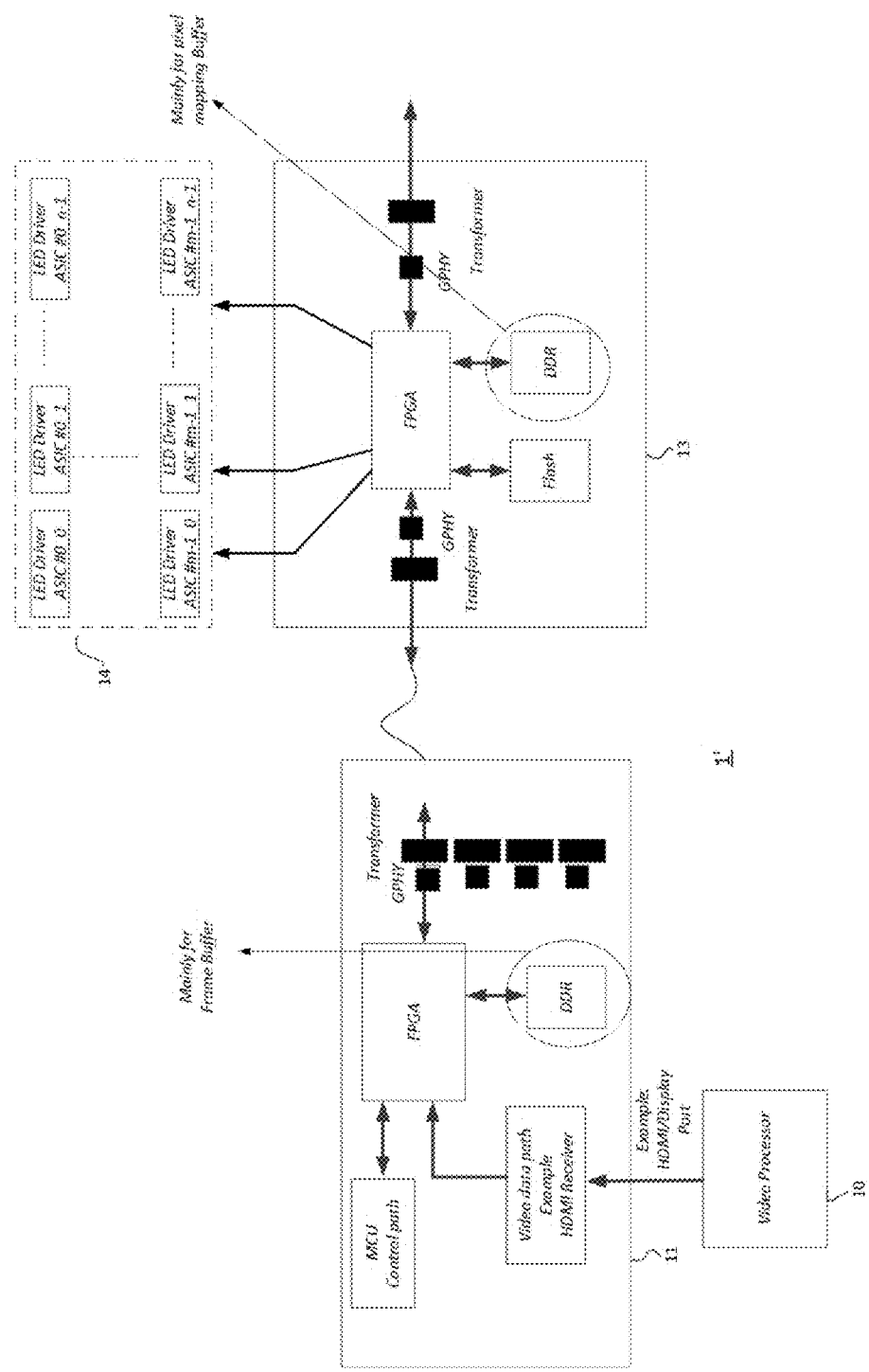
FIG. 2 is a schematic block diagram of an LED system.

In prior art as illustrated in FIG. 1B, a SendBox 12 (not shown in figure) transmits data to receiver cards 13a and 13b via GPHY link 11. GPHY generally requires electrical insulation between port device circuits, e.g., using transformers 11a.

According to the present disclosure, the GPHY link 11 is replaced with the transformerless electrical wire 150. As seen in FIG. 3, for instance, one of the plurality of first receivers 120 is connected to the plurality of second receivers 130 via the transformerless electrical wire 150. Adjacent second receivers 130a and 130b are connected to one another via the transformerless electrical wire 150 as well.

Now, referring to FIGS. 3, 7 and 8, the transmitter 110 receives data from a video processor 10, such as a VCR player, a camcorder, a HD-DVD player, and/or a satellite. The transmitter 110 receives data from a video processor 10 via a data port. The data port can be, for example, HDMI (High-Definition Multimedia Interface). HDMI has been selected for illustrative purpose only, and the transmitter 110 can receive data via other types of data ports.

The plurality of first receivers 120 receive data from the transmitter 110 and then distribute data to their respective locations in the plurality of second receivers 130, i.e. 130a and 130b, which are connected serially or parallelly. After receiving data, each of the plurality of second receivers 130 further distributes the received data to the sets of LED drivers 140, i.e. 140a and 140b attached thereto. The transformerless electrical wire 150 is configured to connect the plurality of first receivers 120 and the plurality of second receivers 130 without transformers 11a.

The transformerless electrical wire 150 is a functional block or wire which can be used in high speed communication without transformers. The transformerless electrical wire 150 can convert data between serial data and parallel interfaces in either direction. The transformerless electrical wire 150 can be used for short-distance link and can include, for instance, a serializer/deserializer (SerDes) link. The transmitter 110 is usually located at a distance from the first receivers 120, e.g., up to 100 m. The connection between the transmitter 110 and the first receivers 120 is often established by a GPHY link. The first receivers 120 and the second receivers 130 are located within a short-distance, e.g., less than 50 m, less than 20 m, less than 10 m, less than 5 m, and are connected via the transformerless electrical wire 150.

Additionally, the transformerless electrical wire 150 is less expensive than GPHY because it does not require transformers. The transformerless electrical wire 150 such as SerDes can readily be integrated into ASIC chip and thus enable the use of smaller receiver ASIC chips. With the introduction of the transformerless electrical wire 150, the LED display panel can be made as a total ASIC solution. Furthermore, the adoption of the transformerless electrical wire 150 reduces the size of the plurality of first receivers 120 and the plurality of second receivers 130 and in turn reduces the size of the LED system 100.

SerDes is only one example of the transformerless electrical wire 150. Other short-distance link technologies may be employed for implementing the transformerless electrical wire 150. Referring now to FIG. 4, one of the plurality of first receivers 120a is linked to one of the plurality of second receivers 130a1 via the transformerless electrical wire 150. The second receiver 130a1 is linked to its adjacent receiver 130a2 via the transformerless electrical wire 150. The first and second receivers 120 and 130 can be arranged serially or in parallel and can be linked using the transformerless wire link 150.

Referring to FIGS. 3, 7, and 8, one of examples of the LED system 100 using transformerless wire link 150 is depicted. As an example, the LED system 100 receives video data has a bandwidth of 7.46 Gbps (1920×1080×30×120); the LED driver 140 has clock rate of 6.4 MHz; and the SerDes has clock rate up to 307.2 MHz. SerDes is used herein only as a non-limiting example of the transformerless electrical wire 150.

The video data having a bandwidth of 7.46 Gbps (1920×1080×30×120) has 30 bit per pixel color and is received from the video processor 10. If the 30 bit per pixel color is processed in a double word (32-bit) format, it is more efficient and easy to handle at the LED system 100. If 32-bit format is used, $\frac{1}{16}$ bandwidth (2 bit) may be lost. In such a case, for calculation purpose, a practical bandwidth over this video data is 7.96 Gbps (1920×1080×32×120), which is close to 8 Gbps. However, because Ethernet packets require extra headers and inter packet gaps, the total video data to be processed would exceed 8 Gbps. Such bandwidth requires at least nine (9) GPHY lanes. When nine (9) GPHY lanes are used, each GPHY lane carries 884.7 Mbps (7.96 Gbps/9), which is transmitted to the plurality of first receivers 120. The data of 884.7 Mbps carried by each GPHY lane can be converted for SerDes using 8B/10B encoder for DC-balanced code. Exemplary links used for SerDes technology include PCI-e, SATA, USB3.0, RAPID I/O, CEI-6G-SR, DP, VbyOne, XAUI, SGMII etc. After the 8B/10B encoder, the 884.7 Mbps is converted into 1.106 Gbps. To process 1.106 Gbps, 1.25 Gbps SerDes such as SGMII can be adopted to carry all information.

In another example, a data rate of 307.2 Mbps can be used instead of 1.25 Gbps SerDes. With the 307.2 Mbps data rate, four (4) SerDes Ports per each of the plurality of first receivers 120 are required to process the 1.106 Gbps. At the plurality of second receivers 130, the data rate of 307.2 Mbps is converted into 30.72 MByte/sec through 10B/8B decoder. Counting by D-word, 7.68 MHz (30.72M/4) is obtained. Here, a D-word is 32-bit which can carry 30-bit (10 bit RGB) with 2 bit redundant. Thus, 7.68 MHz becomes a transfer pixel rate. As the clock rate of LED driver 140 is 6.4 MHz, the 7.68 MHz pixel rate obtained through SerDes provides enough speed to cover the required clock rate of 6.4 MHz at LED driver 140. Such a clock rate allows DC coupling and simplifies the PCB board. Each of the first receivers 120 and each of the second receivers 130 can employ 8B/10B encode in transmit side and 10B/8B decode in receiver side. So that for the retimed portion, each of the second receivers 130 can do 8B/10B encode so as to transmit the data to adjacent second receiver 130.

8B/10B code is a code book to map byte data into 10-bit code book. The code book defines a plurality of control codes of K-code. For example, D-code may refer to data codes while K-code may refer to control codes. Transformerless wire link 150 such as SerDes can employ protocols using K-code as frame wrapper to package a frame before a transmission. Regarding K-codes, for example, K28.5 is about IDLE (primitive); K27.7 is about Start of Frame primitive; K29.7 is about End of Frame primitive; and K28.3 is about VSYNC primitive.

As can be seen in FIG. 7, the transformerless wire link 150 employs DC-coupled low voltage differential signal (LVDS) technology and low-bandwidth phase-locked loop (PLL). The source clock is provided by the plurality of first receivers 120 and passed along the transformerless wire link 150. The transformerless wire link 150 connects to a PLL 131 disposed in the first receiver 130a1.

The PLL 131 is a control system that generates an output signal whose phase is related to the phase of an input signal. For example, while there are several possible configurations, it is easy to initially visualize as an electronic circuit consisting of a variable frequency oscillator and a phase detector. The oscillator generates a periodic signal, and the phase detector compares the phase of that signal with the phase of the input periodic signal, adjusting the oscillator to keep the phases matched. Bringing the output signal back toward the input signal for comparison is called a feedback loop since the output is fed back toward the input forming a loop.

The PLL 131 provides all required clocks for the internal LVDS receiver/transmitter circuits in first receiver 130a1 as well as for adjacent first receiver 130a1 and all subsequent first receivers linked serially in the receiver chip chain. The PLL 131 of the first receiver 130a1 also generates a low jitter clock for the next receiver chip 130a2. This architecture requires no additional components (such as transformer 11a), between any two adjacent first receivers 130a1 and 130a2 along a serially arranged receiver chip chain except the transformerless wire link 150. Thus, this architecture according to the present disclosure eliminates numerous GPHY ports and transformers. By eliminating GPHY ports and transformers, the plurality of first receivers 120 and the plurality of second receivers 130 can be downsized. Productions costs are also reduced and the achievement of an ultra-thin LED display panel becomes possible.

As shown in FIG. 4, first receivers 120 is coupled to transmitter 110. The video processor 10 is connected to the transmitter 110 via HDMI. HDMI has been selected for an illustrative purpose only; other link types may be used to connect the video source 10 with the transmitter 110. Transmitter 110 sends various signals and data from the contents sources to first receivers 120. First receivers 120 can have plural input and output ports (not shown), which are connected to the transmitter 110. Each of input and output ports can have CAT5/CAT6 cable with gigabits data rate when first receivers 120 communicate with transmitter 110. First receivers 120 can include L number of first receivers. For the purpose of exemplary illustration only and as shown in FIG. 5, first receiver 120 includes nine (9) first receivers 120a, 120b, 120c, 120d, 120e, 120f, 120g, 120h, and 120i.

As shown in FIG. 4, second receivers 130 are coupled to a corresponding first receiver 120 in a parallel manner. Second receivers 130 receive various signals and data from first receivers 120, and transmit the same to LED drivers 140.

Second receivers 130 may have N number of second receiver modules. As shown in FIG. 5, for instance, second receivers 130 have four (4) second receiver modules 130a, 130b, 130c, and 130d.

Each of L number of first receivers 120 is coupled to every of N number of second receiver modules in a parallel manner. For instance, first receiver 120a is coupled to each one of four (4) second receiver modules 130a, 130b, 130c, and 130d. N number of second receiver modules e.g. 130a, 130b, 130c, and 130d, may be parallelly coupled to first receiver 120a.

First receiver 120a transmits data to its parallelly coupled four (4) second receiver modules 130a, 130b, 130c, and 130d using a time domain multiplexing division access protocol. First receiver 120a transmits data to the coupled receiver modules using time domain multiplexing. Then, each second receiver module 130a, 130b, 130c, and 130d retrieves its own time slot information to process the data designated thereto.

Each of N number of second receiver modules, e.g. 130a, 130b, 130c, and 130d may include M number of second receivers, e.g. 130a1, 130a2, 130a3, 130a4, 130a5, and 130a6. M number of second receivers may be serially arranged. Thus, with respect to the number of first receivers 120 and second receivers 130, there are L number of first receivers 120 and L×M×N number of second receivers 130. Second receivers 130 can be configured to support FCCL (full content cycle lighting), Calibration data, and Gamma Table correction.

Each of first receivers 120 can transmit data in Low Voltage Differential Signaling (LVDS) format to second receivers 130. LVDS may be transmitted at 307.2 MHz signal rate, and when 8B/10B code is used, real data rate may be around 245.76 M. 8B/10B encoding addresses the coding process that each incoming octet passes down and encodes it into a ten-bit code group. Each octet is given a code group name according to the bit arrangement.

The configuration shown in FIG. 4 has technical advantages because it requires less transformers and gigabit Ethernet ports. As the prior art example illustrated in FIG. 1A shows, each of the receiver cards 13 requires a transformer and a gigabit Ethernet port. The resulting large number of transformers and gigabit Ethernet ports generate EMI and occupy valuable space. However, according to the present disclosure, only first receivers 120 requires transformers and gigabit Ethernet ports to communicate with the transmitter. In other words, only L number of first receivers 120, instead of L×(M×N) receivers, requires transformers and gigabit Ethernet ports. That is because, as was shown in FIG. 3, each of first receivers 120 (referred to as bridge chip in FIG. 3) can transmit data in Low Voltage Differential Signaling (LVDS) format to second receivers 130 (referred to as receiver chip in FIG. 3), instead of Gigabit Ethernet ports. Accordingly, having two types of receiver units and adopting LVDS format for communication between them reduces the number of transformers and gigabit Ethernet ports. Another advantage according to the present disclosure is that the conventional sending card, first receiver cards, and second receiver cards can be replaced by ASIC chips, which occupies a comparatively small space. Thus, LED display panels according to the present disclosure can be configured to have a very compact structure.

LED drivers 140 are electrical devices that regulate the power or signal to LEDs or string(s) of LEDs. Each of second receivers, e.g. 130a6 is coupled to each one of O number of LED driver groups, e.g. 140a, 140b, 140c, 140d, and 140e. Each of O number of LED driver groups, e.g. 140a includes P number of LED drivers, e.g. 140a1, 140a2, and 140a3. In other words, first module's sixth (6$^{th}$) second receiver 130a6 is coupled to fifteen (15) LED drivers (five LED driver groups×three LED drivers). LED driver Groups 140a, 140b, 140c, 140d, and 140e are parallelly coupled to second receivers, e.g. 130a6. LED drivers 140a1, 140a2, and 140a3 are serially arranged.

FIG. 5 is a schematic block diagram showing an arrangement of first and second receivers 120 and 130 across the LED display panel (not shown). An exemplary LED display panel may have a resolution of 1920×1080 pixels. According to one aspect of the disclosure, as shown in FIG. 5, there are nine (9) first receivers 120a, 120b, 120c, 120d, 120e, 120f, 120g, 120h, and 120i. Four second receiver modules 130a, 130b, 130c, and 130d are coupled to first receiver 120a. Each of second receiver modules 130a, 130b, 130c, and 130d includes six (6) second receivers, e.g. 130a1, 130a2, 130a3, 130a4, 130a5, and 130a6. Since first receivers 120 and second receivers 130 may be disposed on the display device as chip components without transformers, the size of the LED system 100 can be minimized, and thus a compact LED display panel can be fabricated.

Transmitter 110 can be any form of sending cards, sending boxes, or personal computers with Ethernet gigabit ports. The plurality of transmitters 110 can be disposed outside of LED display panel. Alternatively, transmitters 110 can be a gigabit port input and LVDS port with Clock Date Recovery(CDR) output, which are implemented in FPGA and/or ASIC. In this case, transmitters 110 can also be disposed on LED display panel.

The LED display panel can include a great number of discrete LED pixels and processors. Inconsistencies among these components may result in variations in, e.g., color and luminance across the display so that a calibration process is needed.

After the calibration process, the calibration data can be stored in a flash memory so that, while in a power up stage as requested by a controller, the calibration data can be used as reference data for each of LED drivers 140 so as to make the LED display panel more uniform in color and luminance.

FIG. 7 is a detailed schematic block diagram showing one set of the first receiver 120a, sixth (6th) second receiver 130a6, and LED drivers 140. The first receiver 120a can be coupled to 130a6 as well as the first(1$^{st}$), second (2$^{nd}$), third (3$^{rd}$), fourth (4$^{th}$), and fifth (5$^{th}$) second receiver 130a1, 130a2, 130a3, 130a4, and 130a5. FIG. 7 shows that first receiver 120a is coupled to sixth (6$^{th}$) second receiver 130a6. Sixth (6$^{th}$) second receiver 130a6 is coupled to five LED driver groups 140a, 140b, 140c, 140d, and 140e. Only sixth (6$^{th}$) second receiver 130a6 is described for illustrative purposes; however, each one of second receivers 130a1, 130a2, 130a3, 130a4, and 130a5 can have same or similar function therewith. Sixth (6$^{th}$) second receiver 130a6 includes processor 130a6p. Processor 130a6p can include a register memory. Processor 130a6p and the register memory can be coupled to first memories 130a6m1, 130a6m2, 130a6m3, 130a6m4, and 130a6m5. First memories 130a6m1, 130a6m2, 130a6m3, 130a6m4, and 130a6m5 are parallelly arranged among themselves and have static random access memories (SRAMs).

Data distribution requires pixel mapping for the image sent from the initial video processor 10 to appear unaltered on the LED display panel (not shown). Conventionally, pixel mapping is done by both the sendbox 12 and the receiver cards 13. The present disclosure places the pixel mapping function s in the transmitter 110.

Figure 9:
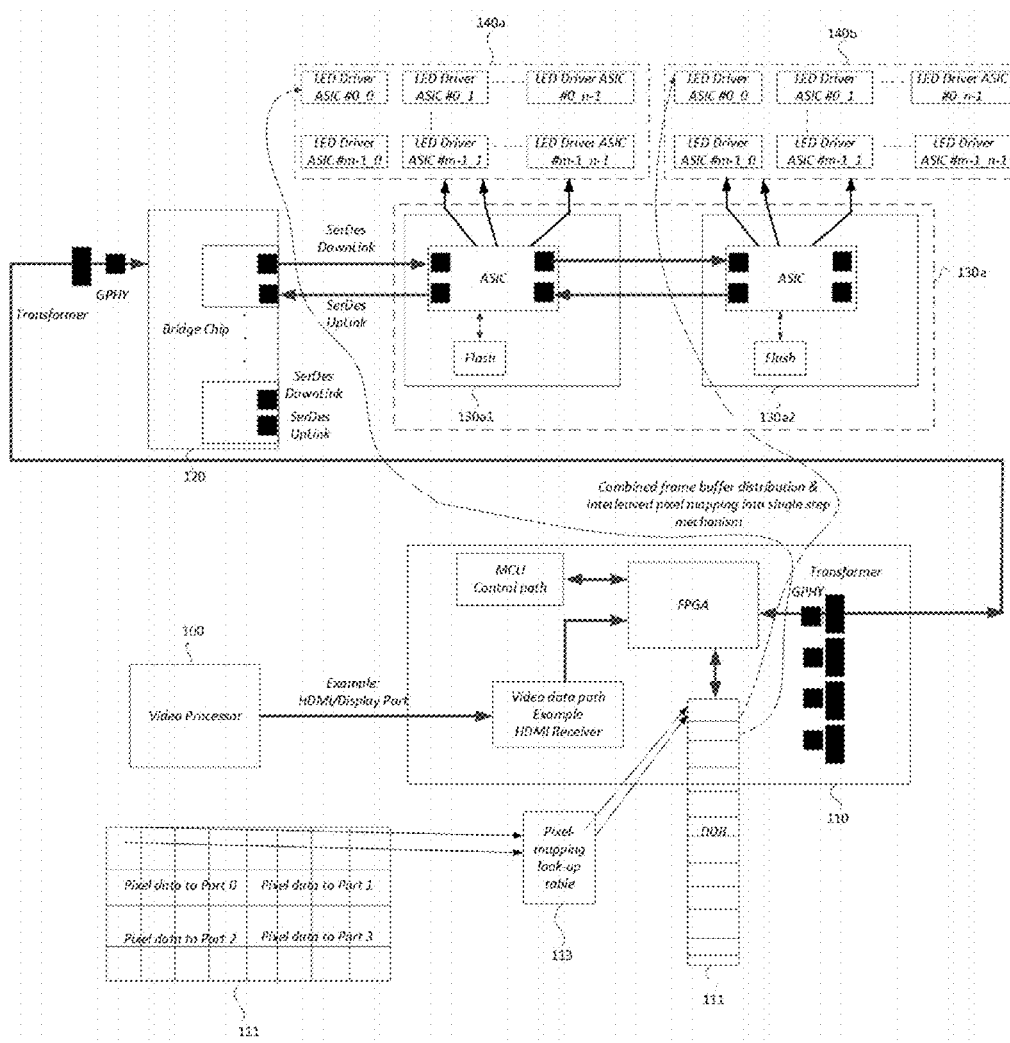
FIG. 9 is a schematic block diagram showing a configuration of an LED system.

FIG. 9 is a schematic block diagram showing a configuration of an LED system 101. It includes a transmitter 110, a plurality of first receivers 120, a plurality of second receivers 130, and a plurality of LED drivers 140. Transmitter 110 includes a memory 111 and a pixel-mapping look up table 113.

FIG. 9 illustrates the interleaved pixel mapping algorithm of the current disclosure. Video processor 10 sends pixels to transmitter 110. During frame buffer time, small amounts of pixel data are saved in an interleaved manner into calculated locations in the memory 111, which is a double data rate synchronous dynamic random-access memory (DDR SRAM) positioned in transmitter 110. The stored interleaved pixel data in the frame buffer is then fetched and sent to first receivers 120. From first receivers 120, the interleaved pixel data is sent to its respective location in each of the first receivers 130a and/or 130b, depending upon the intended location for transmission. Upon receiving the interleaved pixel data, the first receiver 130a or 130b relays the data to the final destination, LED drivers 140a or 140b.

The configuration in FIG. 9 has technical advantages over that of the prior art in the following aspects. In the prior art, each receiver card is responsible for the pixel mapping function. Thus, each receiver card needs a significantly large external memory. In contrast, as shown in FIG. 9, the memory 111 in the transmitter 110 is now exclusively responsible for the pixel mapping function. Consequently, the second receivers 130 does not require a memory equivalent to the memory 111.

The link between the first receivers 120 and the second receivers 130 is a time domain multiplexing division access protocol. Thus, data is broadcasted to media in time domain multiplexing. Each of the second receivers 130 is configured to retrieve its own time slot information to process. This mechanism can be adopted in shared bus or wireless configuration. The connection can be retimed point to point to maintain high speed of the transformerless wire link 150 including SerDes. Accordingly, a mechanism for self-addressing is a necessity so that each of the second receivers 130 can retrieve its own time slot.

An interleaved pixel mapping refers to a pixel mapping using an interleaved method. In a LCD Display System, a pixel mapping or an interleaved pixel mapping is not required because the video data from video processor 10 is carried in a sequential manner from 1$^{st}$ line to the last line to complete a frame. However, with respect to LED display system 101, video data from video processor 10 is not directly connected to a final LED display panel. Instead, the video data need to be distributed through the transmitter 110 (sendbox), the first receivers 120 (bridge chip), the second receivers 130 (receiver card), and LED driver 140. Thus, in LED display system 101, the video data is broken down into a plurality of data segments from a transmission end. The plurality of data segments are restored at the receiving end to constitute a complete image. This process is called an interleaved pixel mapping. The interleaved pixel mapping can be performed by an automatic address mapping at the first receivers 120. The first receivers 120 can transmit a complete frame buffer so that it can be distributed via data channel.

Referring to FIG. 9, video data is first sent from video processor 100 to transmitter 110 (SendBox). In the interleaved manner described previously, data is broken up into segments and saved to memory 111, which is typically a DDR SDRAM. Before the interleaved pixel data 111 is saved to memory 111, each interleaved pixel data 111 goes through pixel-mapping lookup-table 113, which is a database and stores pixel data 111 in a predefined order. Without the pixel-mapping lookup-table 113, the interleaved pixel data would be stored in a random manner in memory 111, making it impossible for the first receivers 120, the second receivers 130, and set of LED drivers 140 to recognize data forwarded thereto. For instance, when pixel_data_to_port_0 in interleaved pixel data 111 is sent from video processor 10 to transmitter 110, pixel_data_to_port_0 initially goes through pixel-mapping-lookup-table 113 and is given a unique address. Then, pixel_data_to_port_0 with unique address attached is saved to memory 111. Afterwards, pixel_data_to_port_0 with unique address attached is now sent from memory 111 in transmitter 110 (SendBox) to the plurality of the first receivers (bridge chips) 120. Upon receiving of data, each of the first receivers 120 pass data to the designated second receivers 130. Upon receiving of data, the designated second receivers 130 forwards data to the final destination—the designated plurality of LED driver 140. Data reception and forwarding all occur in the manner already described previously in this disclosure.

Figure 10:
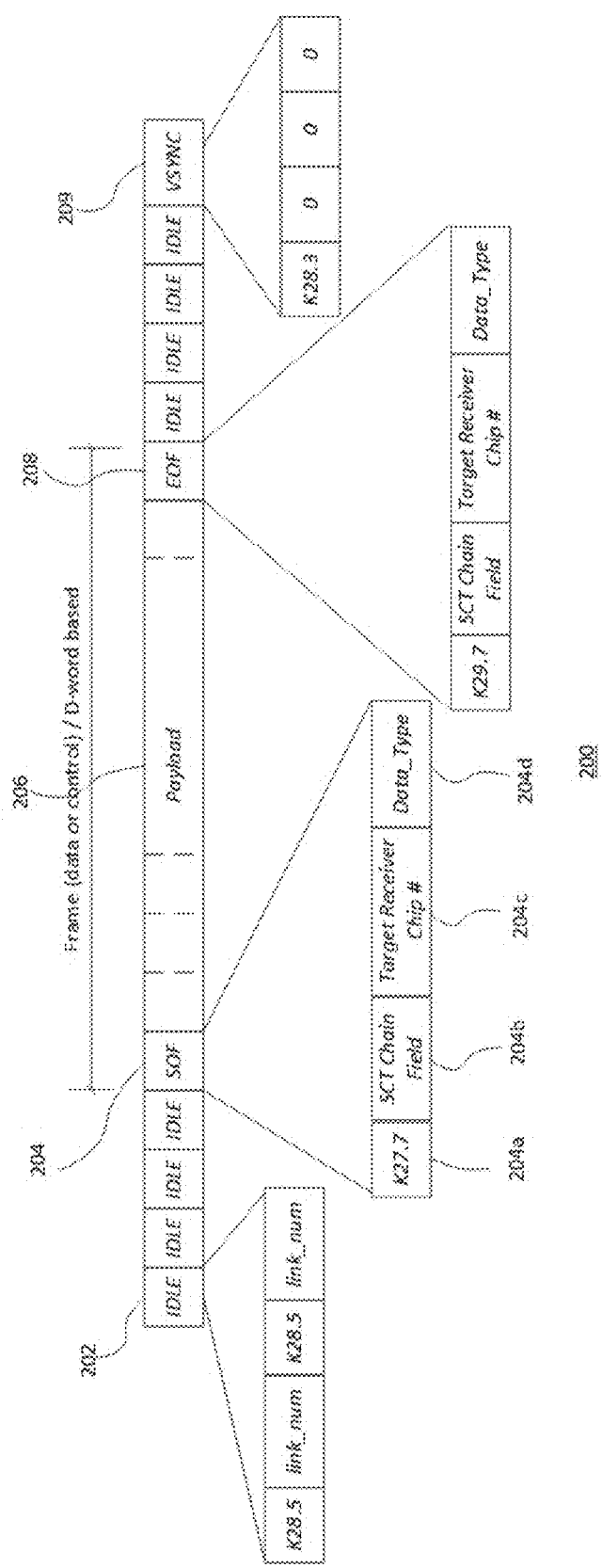
FIG. 10 is a block diagram illustrating a structure of a configuration data packet.

FIG. 10 is a block diagram illustrating a structure of a configuration data packet 200. A configuration data packet 200 includes a comma 202, a first segment 204, a payload 206, a second segment 206, and a third segment 208, and a fourth segment 209. The data packet 200 has a D-word (32-bit) format, which can be 40-bit after 8B/10B encoded. The comma 202 serves to fill the gap between valid frames. A plurality of the commas 202 can be inserted between frames. The first segment 204, the payload 206, and the second segment 208 are data type to be delivered. The frame is encapsulated by the first segment 204 (SOF) and the second segment 208 (EOF) can be constituted by one D-word. The payload 206 may have a multitude of D-words.

The first segment 204, for instance, includes information regarding the automatic address, which can be used for finding the final designation of the relevant data. The first segment 204 can be composed of 4 bytes (D-word). First segment 204 includes a start of frame 204a, set of field information 204b, target receiver chip information 204c, and data mode information 204d. Start of frame 204a is K-code (K27.7). Set of field information 204b is defined as chain ID. Chain ID is 0 from the first receivers 120. While doing the retime process and delivered to adjacent second receivers 130, the retime logic add value one (1) (or minus value one). Target receiver chip information 204c has a target receiver chip ID. Data mode information 204d includes information of the data-type, which defines payload sub-target device and format. The first segment 204 includes the information about the final destination from the first receivers 120 to LED driver 140. The fourth segment 209 includes a Vsync signal data. Each and every one of second receivers 130 can use a VSYNC action with the fourth segment 209.

Figure 11:
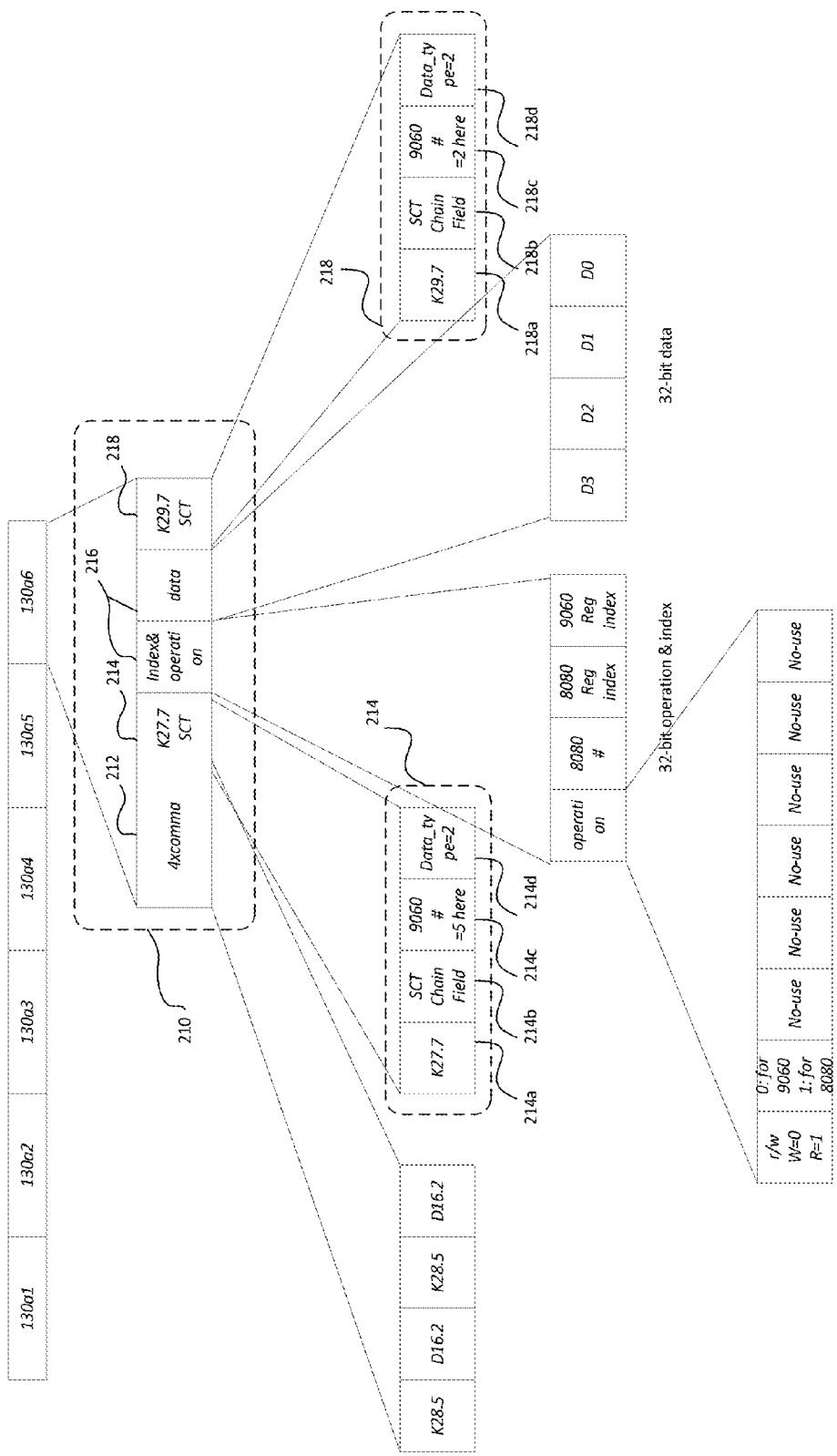
FIG. 11 is a block diagram illustrating a structure of a configuration data packet.
Figure 12:
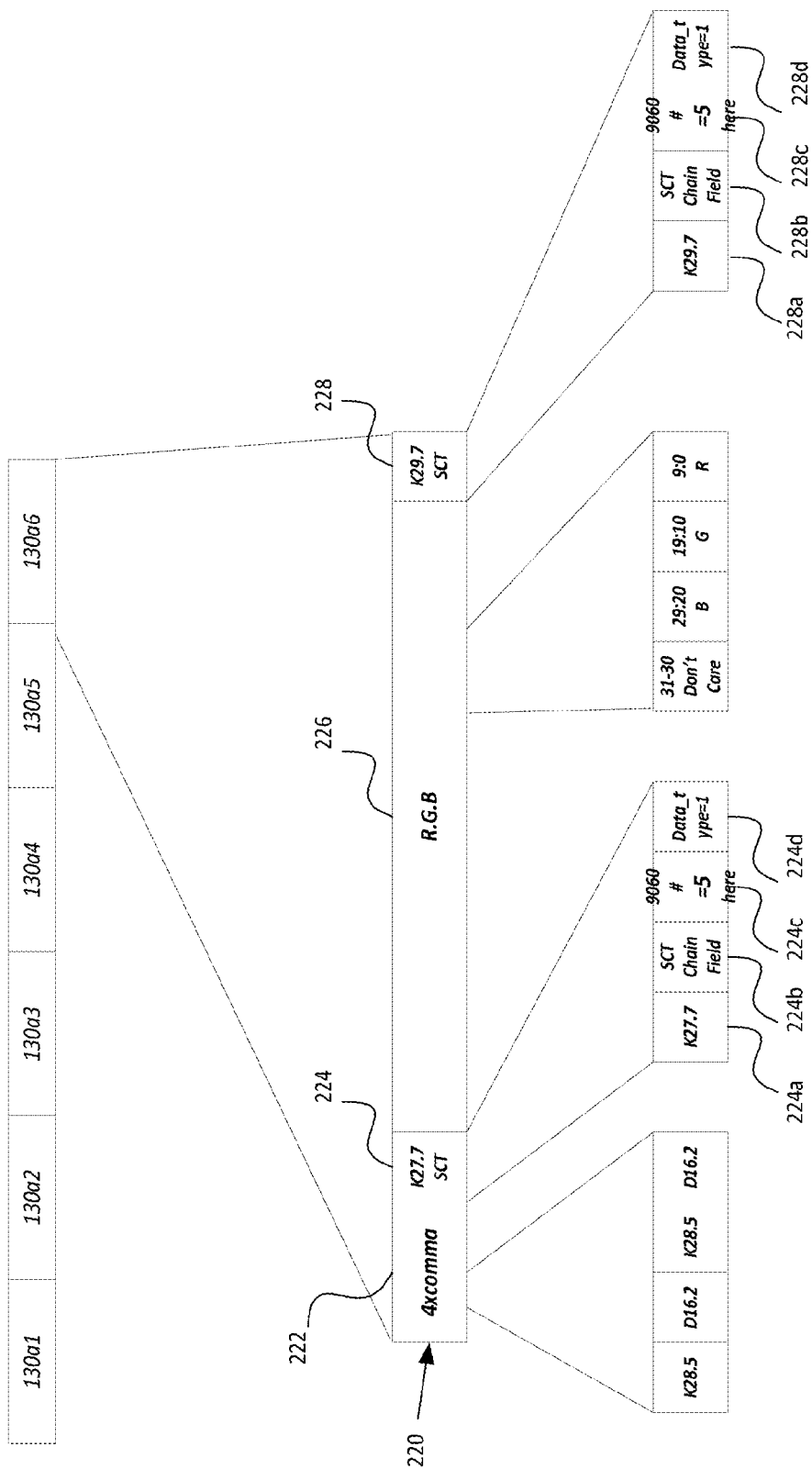
FIG. 12 is a block diagram illustrating a structure of an image data packet.

Referring to FIGS. 11 and 12, another example of data packets 210 and 220 is described. FIG. 11 is a block diagram illustrating a structure of a configuration data packet 210. FIG. 12 is a block diagram illustrating a structure of an image data packet 220. PWM data, configuration register data, and flash memory data can be transmitted from each of first receivers 120 to plurality of second receivers 130. It is important to transmit such data to the designated second receiver or LED driver in a synchronous manner. FIGS. 11 and 12 illustrate a data packet structure that transmits data from first receivers 120 to designated second receivers 130 in a synchronous manner. In a similar manner, data can be transmitted from second receivers 130 to LED drivers 140.

Each of configuration data packet 210 and image data packet 220 includes a comma 212 and 222, a first segment 214 and 224, a second segment 216 and 226, and a third segment 218 and 228. Configuration data packet 210 and image data packet 220 contain configuration data and image data, respectively. Image data include PWM and flash memory, LED Driver's configuration and control data. Since configuration data packet 210 and image data packet 220 have similar a data structure, for the purpose of simplicity, configuration data packet 210 and image date packet 220 are described together below.

A comma 212 and 222 is a special sequence of bits, and works as a preamble of the data packet. The notation used for ordered sets is similar to that used for code groups. Code groups are written as either /Dx.y/ or /Kx.y/ as shown in FIGS. 8 and 9. Although FIG. 11 and FIG. 12 depict 4×comma for illustrative purposes. Embodiments according to the present description may have, for instance, 5×, 6×, 7×, 8×, and 10×comma.

In particular, ordered sets of K28.5 is used in comma 212 and 222 as the first code group. K28.5 is a pre-defined unique data pattern. The reception of K28.5 will not happen during data packet process unless there is a data error. Thus, K28.5 can be used with specific ordered sets such as a starting point of an idle or configuration.

First segment 214 and 224 includes a start of frame 214a and 224a, set of field information 214b, 214c, 224b, and 224c, and data mode information 214d and 224d. A data packet on the wire is called a frame, which consists of binary data. A start of frame 214a and 224a marks a starting point of packet frames. The set of field information 214b, 214c, 224b, and 224c is described in detail with reference to FIGS. 10A and 10B. Data mode information 214d and 224d indicates whether the data information is configuration data or image data.

Second segment 216 and 226 contains data information. For example, second segment of configuration data packet 216 includes configuration information. Configuration information includes index and operation information, and configuration data. For example, operation information includes read/write instructions. Index information includes whether the designation of the data packet is second receivers 130 or LED driver 140. Configuration data includes detailed configuration data 210 and a part of configuration data space can be reserved for future use. Second segment of image data packet 226 includes image data such as red-green-blue (RGB) data.

Third segment 218 and 228 includes an end of frame 218a and 228a, a set of field information 218b, 218c, 228b, and 228c, and data mode information 218d and 228d. Third segment 218 and 228 has similar structure with first segment 214 and 224. End of frame 218a and 228a marks an ending point of packet frames.

Figure 13A:
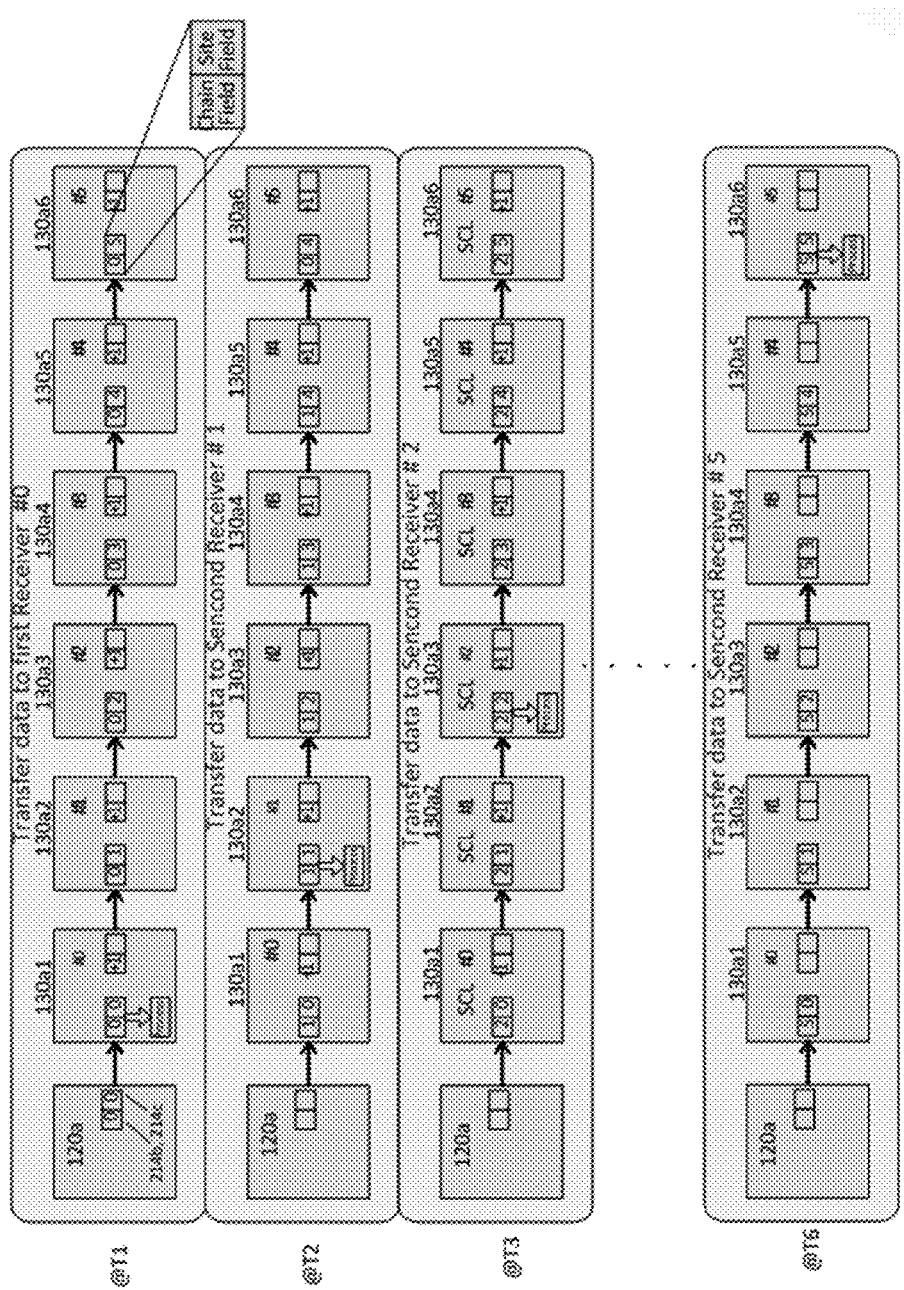
FIGS. 13A and 13B are block diagrams illustrating a method to change a first field information and a second field information.

Referring now to FIG. 11 and FIG. 13A, the set of field information 214b, 214c, 218b, and 218c is described. Configuration data packet in first segment 214b and 214c has same structure and value with configuration data packet in third segment 218b and 218c. Only configuration data packet in first segment 214b and 214c is described hereafter. Configuration data packet in first segment 214b and 214c includes a first field information 214b and a second field information 214c.

First receivers 120 can initially set up the first field information 214b and second field information 214c for "K27.7_SCT" and "K29.7_SCT." According to one embodiment of the current disclosure, for example, first receivers 120 sets up first field information 214b as zero value (0) and second field information 214c as 0, 1, 2, 3, 4, and 5, which each value corresponds to one of second receivers 130, respectively, where six (6) second receivers 130 are serially arranged. First ($1^{st}$) second receiver 130a receives zero value (0) of first field information 214b and adds one (1) value thereto. First ($1^{st}$) second receiver 130a then transmits the value of one (1) to next second ($2^{nd}$) second receiver 130b and add one (1) value thereto again. Each second receivers 130 compares first and second field information 214b and 214c whether they match or not. If first and second field information 214b and 214c are matched, the second receiver 130 receives the data packet. If first and second field information 214b and 214c does not match one another, the second receiver 130 does not receive that data packet. In this way, the second receiver 130 receives correctly assigned data and control command assigned to the second receiver 130. For instance, this protocol can be used for up to 256 ($2^8$) second receivers serially connected to one another. However, the number is not limited to the above example. For example, if 12 bits are selected to express the field information, this protocol can be used for up to 4096 ($2^{12}$) second receivers, which are serially connected to one another. Each of the second receivers' address and data is initially automatically programmed to be matched by the first receiver.

For example, referring now to FIG. 11 and FIG. 13A, at T1, the first ($1^{st}$) second receiver 130a1 is connected to the first receiver 120a. The first ($1^{st}$) second receiver 130a1 recognizes that the first ($1^{st}$) field value of the $1^{st}$ "K27.7_SCT" is zero (0) and second ($2^{nd}$) field value is also zero (0). Since first ($1^{st}$) field value matches $2^{nd}$ field value, the first ($1^{st}$) second receiver 130a1 receives the data which are contained after the first ($1^{st}$) K27.7_SCT and replaces the first ($1^{st}$) field by adding one (1) and sends the modified content to next second ($2^{nd}$) second receiver 130a2. At T2, the second ($2^{nd}$) second receiver 130a2, which is connected to the first ($1^{st}$) second receiver 130a1, checks a first ($1^{st}$) field value of K27.7_SCT, which is one (1), and a second ($2^{nd}$) field value, which is also one (1). Since the first ($1^{st}$) field value matches second ($2^{nd}$) field value, the second ($2^{nd}$) second receiver 130a2 receives the data, which are contained after the second ($2^{nd}$) K27.7_SCT, and replaces the first ($1^{st}$) field by adding value one (1) and sends the modified content to next third ($3^{rd}$) second receiver 130a3.

At T3, the third ($3^{rd}$) second receiver is connected to the second ($2^{nd}$) second receiver 130a2 and checks the first ($1^{st}$) field value of the third ($3^{rd}$) K27.7_SCT. The first ($1^{st}$) field value is two (2) and the second ($2^{nd}$) field value is two (2). Since the first ($1^{st}$) field value matches the second ($2^{nd}$) field value, the third ($3^{rd}$) second receiver 130a3 receives the data, which is contained after the third ($3^{rd}$) K27.7_SCT, and replaces the first ($1^{st}$) field by adding value one (1) and sends the modified content to next second receiver 130a4. At T4 (not shown), the fourth ($4^{th}$) second receiver 130a4 is connected to the third ($3^{rd}$) second receiver and checks the first ($1^{st}$) field value of the fourth ($4^{th}$) K27.7_SCT. First ($1^{st}$) field value is three (3) and the second ($2^{nd}$) field value is three (3). Thus, the first ($1^{st}$) field value matches the second ($2^{nd}$) field value. Then, the fourth ($4^{th}$) second receiver receives the data, which is contained after the fourth ($4^{th}$) K27.7_SCT and replaces the first ($1^{st}$) field by adding value one (1) and sends the modified content to the next second receiver.

At T5 (not shown), the fifth ($5^{th}$) second receiver is connected to the fourth ($4^{th}$) second receiver and checks the first ($1^{st}$) field value of the fifth ($5^{th}$) K27.7_SCT. The first ($1^{st}$) field value is four (4) and the second ($2^{nd}$) field value is four (4). Since the first ($1^{st}$) field value matches the second ($2^{nd}$) field value, the fifth ($5^{th}$) second receiver receives the data, which is contained after the fifth ($5^{th}$) K27.7_SCT and replaces the first ($1^{st}$) field by adding value one (1) and sends the modified content to the next second receiver. At T6, the sixth ($6^{th}$) second receiver is connected to the fifth ($5^{th}$) second receiver and checks the first ($1^{st}$) field value of the ($6^{th}$) K27.7_SCT. The first ($1^{st}$) field value is five (5) and the second ($2^{nd}$) field value is five (5). Since the first ($1^{st}$) field value matches the second ($2^{nd}$) field value, the sixth ($6^{th}$) second receiver receives the data. Each and every second receiver 130a compares the first ($1^{st}$) field value and second ($2^{nd}$) field value of the data packet 214 sent from the first ($1^{st}$) receiver 120a. Each and every second receiver 130a can be configured to receive the packet data if the first ($1^{st}$) field value matches the second ($2^{nd}$) field value but otherwise does not receive the data. Each of second receivers 130a receives assigned data and control command assigned to the right second receiver 130a. This protocol can cover up to 256 ($2^8$) serially connected second receivers 130a.

Figure 13B:
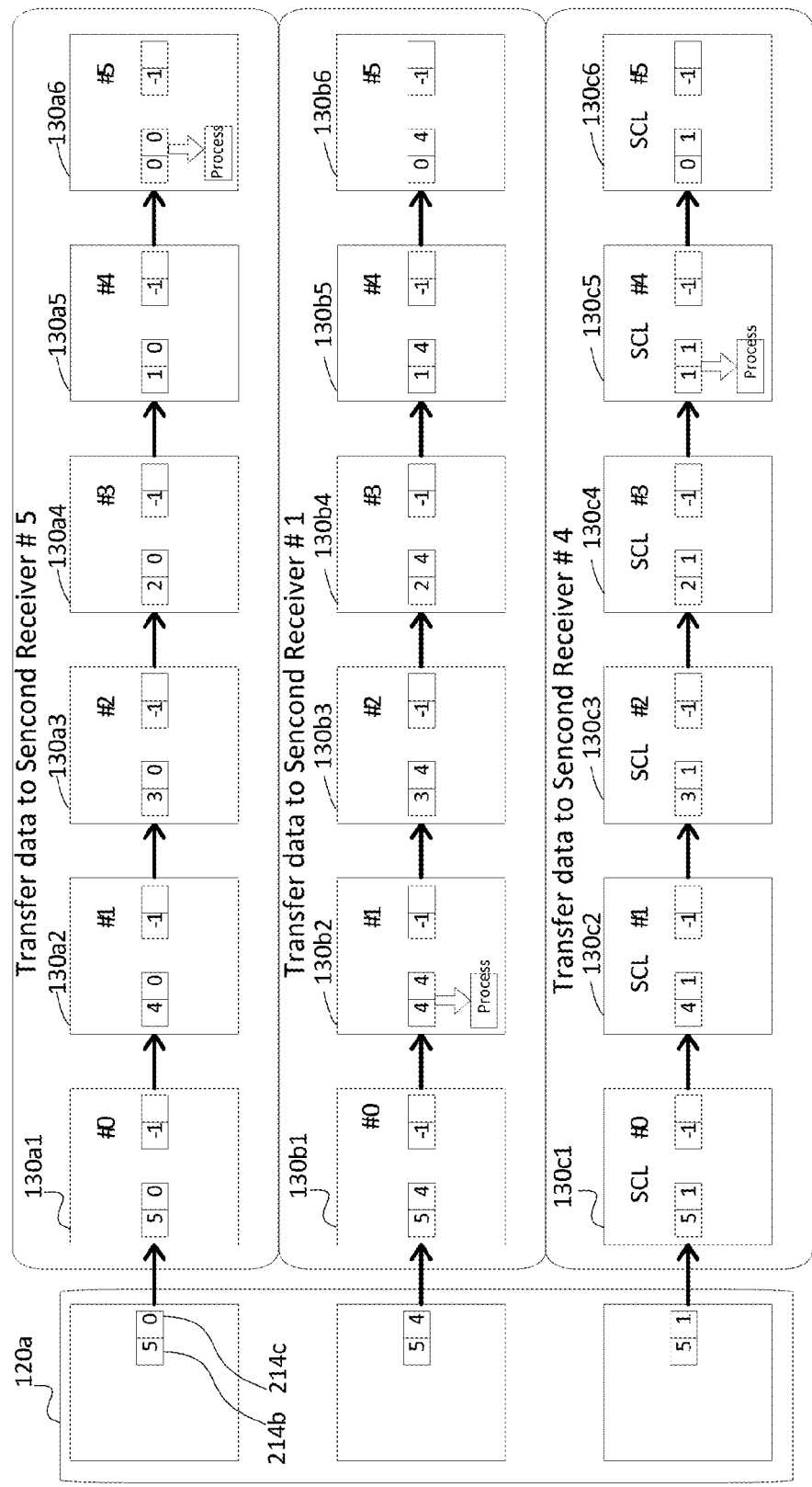

According to another embodiment of the current disclosure, as shown in FIG. 13B, the first field information 214b have a number subtracted one (1) from a total number of the second receivers 130a. It can be expressed as Y−1, where Y refers to the total number of second receivers 130. Second field information 214c is set up to indicate an address of a targeted second receiver to which configuration data packet 210 is designated to convey. For example, if configuration data packet 210 is designated to $X^{th}$ second unit receiver, a value of second field information 214c can be set as Y−X.

In particular, for example, one of first receivers 120a can set up first field information 214b to have a value of five (5) value—a total number (6) of second receivers 130a minus one (1). Regarding second field information, the total number of second unit receivers 130a1, 130a2, 130a3, 130a4, 130a5, and 130a6 in first module 130a is six (6), and thus Y is six (6). If configuration data packet 210 is designated to sixth ($6^{th}$) second unit receiver in first module 130a6, second field information 214c can be set as zero (0), Y(6)−X(6). In another example, if configuration data packet 210 is designated to second ($2^{nd}$) second receiver 130b2 in second module 130b, second field information 214c can be set up as four (4), Y(6)−X(2). In the other example, if configuration data packet 210 is designated to fourth ($5^{th}$) second unit receiver 130c5 in third module 130c, second field information 214c can be set as one (1), Y(6)−X(5).

Set of field information of the configuration data packet 214b and 214c are configured to be changed sequentially by adding or subtracting a predetermined value therefrom when passed in or out of at least one second receiver 130a1. Referring to FIGS. 4 and 13 A/B, the present disclosure describes a method in which data are transmitted from first receivers 120a to sixth ($6^{th}$) second receiver 130a6 in first module 130a; from first receivers 120a to second ($2^{nd}$) second receiver 130b2 in second module 130b; and/or from first receivers 120a to fifth ($5^{th}$) second receiver 130c5 in third module 130c, respectively.

First ($1^{st}$) second receiver 130a1 coupled to first receiver 120a receives configuration data packet 210. Configuration data packet 210 is designated to sixth ($6^{th}$) second receiver 130a6 in first module 130a. As explained above, first field information of second receivers 130a is five (5). Ordered pair of first and second field information is (5, 0) as indicated in FIG. 13B. First ($1^{st}$) second receiver 130a1 compares first field information 214b (5) and second field information 214c (0). If first field information 214b and second field information 214c have the same value, then first ($1^{st}$) second receiver 130a1 receives and processes configuration data packet 210. Since first field information 214b (5) and second field information 214c (0) do not match one another, first ($1^{st}$) second receiver 130a determines that configuration data packet 210 is not designated thereto. Consequently, first ($1^{st}$) second receiver 130a does not process or execute configuration data packet 210 and passes the same onto next receiver, which is second ($2^{nd}$) second receiver 130a2. When configuration data packet 210 passes in or out, first ($1^{st}$) second receiver 130a1 subtracts a predetermined value from first field information 214b. For example, if the predetermined value is one (1), first field information 210 is changed from five (5) to four (4). Thus, ordered pair of first and second field information 214b and 214c now becomes (4, 0). After the subtraction, first ($1^{st}$) second receiver 130a1 passes configuration data packet 210 onto next second ($2^{nd}$) second receiver 130a2. Second ($2^{nd}$) second receiver 130a2 compares first field information 214b (5) and second field information 214c (0). As such, first field information is four (4) and second field information is zero (0). It does not match one another. Thus, second ($2^{nd}$) second receiver 130a2 makes ordered pair of first and second field information from (4, 0) to (3, 0), and passes configuration data packet 210 onto next receiver.

As illustrated in FIG. 13B, when configuration data packet 210 arrives at sixth ($6^{th}$) second receiver 130a6, ordered pair of first and second field information 214b and 214c becomes (0, 0). Sixth ($6^{th}$) second receiver 130a6 compares first field information 214b (0) and second field information 214c (0). They both now have the same value of zero (0). Thus, sixth ($6^{th}$) second receiver 130a6 determines that configuration data packet 210 is designated to sixth ($6^{th}$) second receiver 130a6, and processes or executes any predetermined actions. Such process or execution can include read and write configuration data packet 210 from or onto a memory (not shown) that resides in sixth ($6^{th}$) second receiver 130a6. In doing so, first receiver 120a can transmit configuration and image data packet 210 and 220 to the designated sixth ($6^{th}$) second receiver 130a6. This protocol can be used for up to 256 ($2^8$) serially connected second receivers. However, the number is not limited to the above example. For example, if 12 bits are selected to express the field information, this protocol can be used for up to 4096 ($2^{12}$) serially connected second receivers. Each of the second receivers' address and data is initially automatically programmed to be matched by the first receiver.

Configuration data packet 210 and/or image data packet 220 include(s) numerous commands, which are defined for LED driver 140 and for flash memory control. Commands can be defined by a host personal computer or send box. Commands can be broadcasted to first receivers 120 and be transmitted to second receivers 130. Second receivers 130 can generate pattern system clocks and data receiving control signal for LED drivers 140 based on the reference clock from first receivers 120. The pattern system clocks and data receiving control signals for LED driver 140 are generated by each of second receivers' 130 Clock and Data Recovery (CDR) block. Each of second receivers 130 does need a reference clock from the first receivers 120 to keep the frequency accurate.

FIG. 13B shows another example of how configuration data packet 210 is transmitted from first receivers 120a to second ($2^{nd}$) second receiver 130b2 in second module 130b. In FIG. 10B, the ordered pair of first and second field information is (5, 4). According to the process described above with respect to Sixth ($6^{th}$) second receiver 130a6, second ($2^{nd}$) second receiver 130b2 in second module 130b compares first field information 214b (4) and second field information 214c (4). Since first field information 214b (4) and second field information 214c (4) have same value, second ($2^{nd}$) second receiver 130b2 determines that configuration data packet 210 is designated thereto, and performs necessary process with configuration data packet 210. And then, second ($2^{nd}$) second receiver 130b2 subtracts one from first field information passes configuration data packet onto next third ($3^{rd}$) second receiver 130b3. Regarding other second receivers 130b1, 130b3, 130b4, 130b5, and 130b6 in second module 130b, each of them determines that first field information 214b does not match with second field information 214c. Thus, each of other second receivers 130b1, 130b3, 130b4, 130b5, and 130b6 in second module 130b passes configuration data packet 214b onto next second receiver.

FIG. 13B illustrates still another example of how configuration data packet 210 is transmitted from first receivers 120a to fifth ($5^{th}$) second receiver 130c5 in third second receiver module 130c. Ordered pair of first and second field information is (5, 1). All second receivers 130c1, 130c2, 130c3, 130c4, 130c5 and 130c6 in third second receiver module 130c subtract one from first field information and passes configuration data packet 210 onto next second receiver. Only the fifth ($5^{th}$) second receiver 130c5 processes and executes configuration data packet 210.

Figure 14:
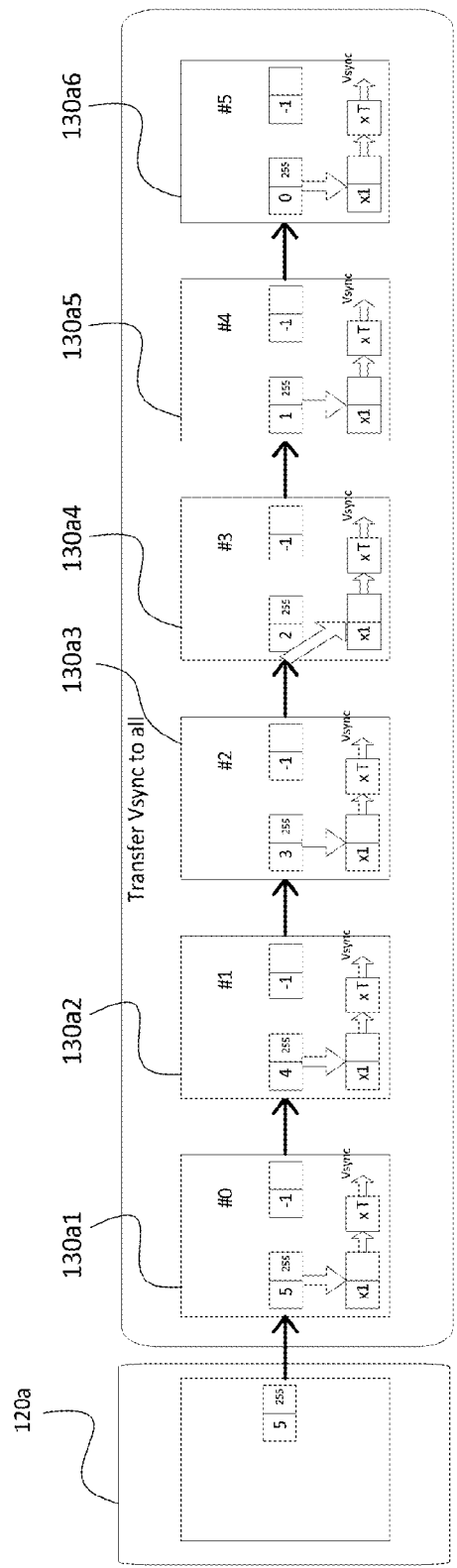
FIG. 14 is a block diagram showing a calculation of $V_{sync}$ signal delay value.

FIG. 14 is a block diagram showing a calculation of $V_{sync}$ signal delay value. It is important to distribute data and signals across plurality of LED drivers in a synchronized manner. $V_{sync}$ signal can be used as an alignment flag among LED drivers. A latency among the LED drivers could cause a command synchronization problem. In this regard, a configuration register of "$V_{sync\_}$delay" can be defined as a synchronization number and by adjusting the value of synchronization number, synchronization problem can be overcome.

First module 130a can include six (6) serially arranged second receivers 130a1, 130a2, 130a3, 130a4, 130a5, and 130a6. Latency from each of second receivers 130a1, 130a2, 130a3, 130a4, 130a5, and 130a6 to LED drivers can create synchronization problems. To attenuate such latency problems, set of field information 214b and 214c can be used. Configuration data packet 210 can include a delay value which reflects the change of first field information 214b. Thus, each of second receivers 130a1, 130a2, 130a3, 130a4, 130a5, and 130a6 can determine a period of delay time transmitting at least one of configuration data packet 210 and/or image data packet 220 to LED drivers 140 according to a set delay value.

In particular, referring to FIG. 14, first ($1^{st}$) second receiver 130a1 coupled to first receiver 120a receives configuration data packet 210. First field information 214b of configuration data packet 210 is five (5) as explained above. Second field information has a synchronization number. The synchronization number can be any pre-defined number and is distinguishable from general second field number 214c. For example, the synchronization number can be two hundred fifty-five (255). Thus, when any second receivers 130a1, 130a2, 130a3, 130a4, 130a5, and 130a6 receive set of field information having the synchronization number, they recognize first field information 214b as delay value.

Referring to FIG. 14, first ($1^{st}$) second receiver 130a1 receives the synchronization number (255). First ($1^{st}$) second receiver 130a1 reads value of first field information 214b as delay value. When configuration data packet 210 passes onto next second receiver, first ($1^{st}$) second receiver 130a1 subtracts a predetermined value from first field information 214b. Where the predetermined value is one (1), the value of first field information 214b changes from five (5) to four (4).

Second ($2^{nd}$) second receiver 130a2 receives first field information 214b, which is now four (4), and recognizes it as a delay value. Likewise, delay value for second receivers 130a3, 130a4, 130a5, 130a6 are three (3), two (2), one (1), and zero (0), respectively.

Since sixth ($6^{th}$) second receiver 130a6 has zero (0) delay value, when the sixth ($6^{th}$) second receiver 130a6 transmits data and signals to LED drivers 140, the transmission time becomes a synchronization time for other second receivers 130a1, 130a2, 130a3, 130a4, and 130a5. Accordingly, when first ($1^{st}$) second receiver 130a1 transmits data or signal to LED drivers 140, it uses the delay value (5) to calculate a period of a delay time so that the transmission time of data from first ($1^{st}$) second receiver can be synchronized with the synchronization time according to the delay time. In a similar way, transmission times from each of second receivers 130a1, 130a2, 130a3, 130a4, and 130a5 can be synchronized with the synchronization time of sixth ($6^{th}$) receiver 130a6.

Figure 15:
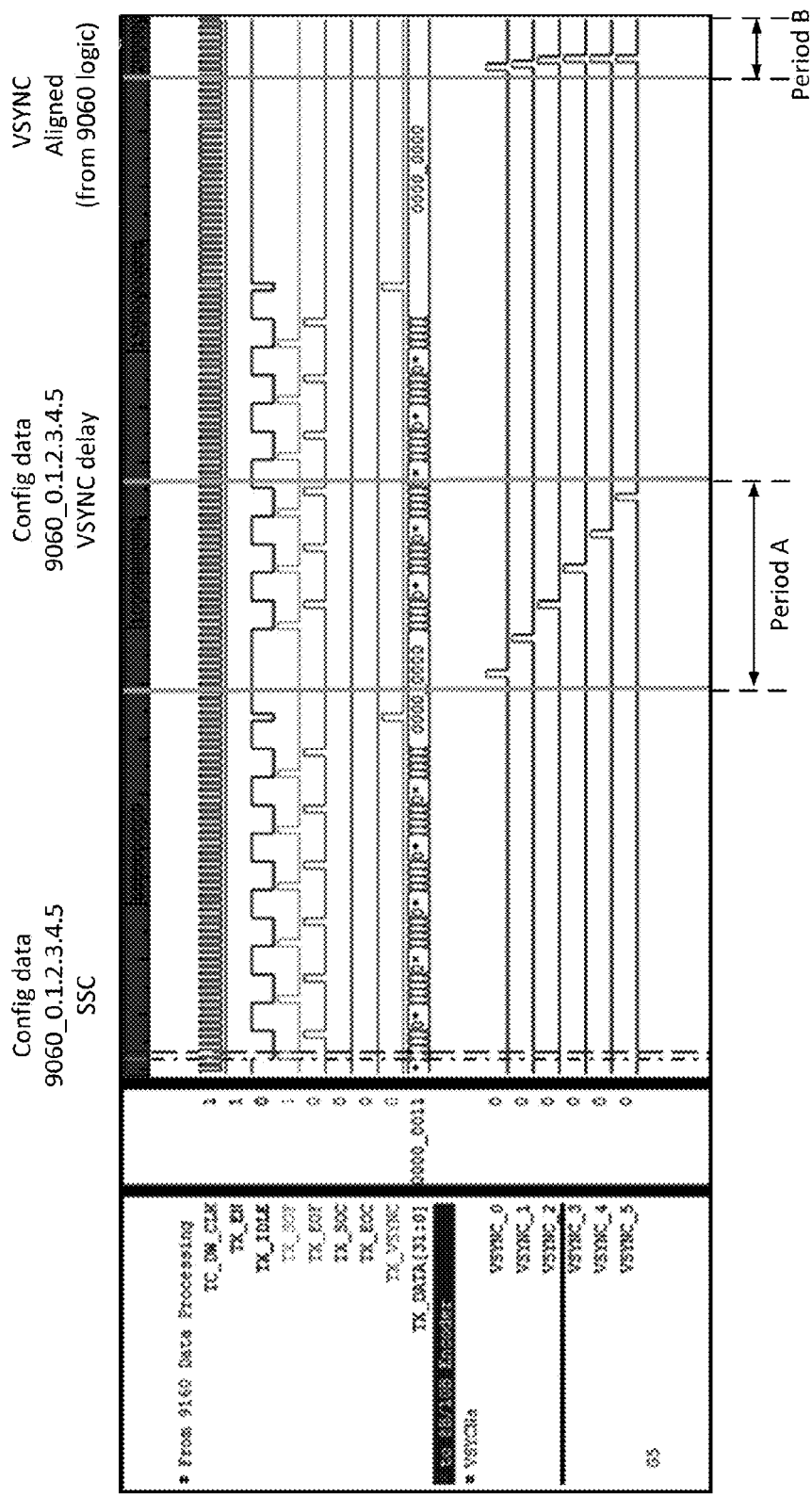
FIG. 15 is a graph showing a configuration data modulation and synchronization thereof.

FIG. 15 is a graph showing a configuration data modulation and a synchronization thereof. Referring to FIG. 15, six different signals are depicted with latencies in Period A. Each of signals comes with a respective delay value, which is calculated in a manner as described in FIG. 14. Each of signals is delayed for a period of the delay time based on the relative delay value. Period B in FIG. 15 depicts synchronized six signals at the synchronization time after the period of the delay time.

Figure 16:
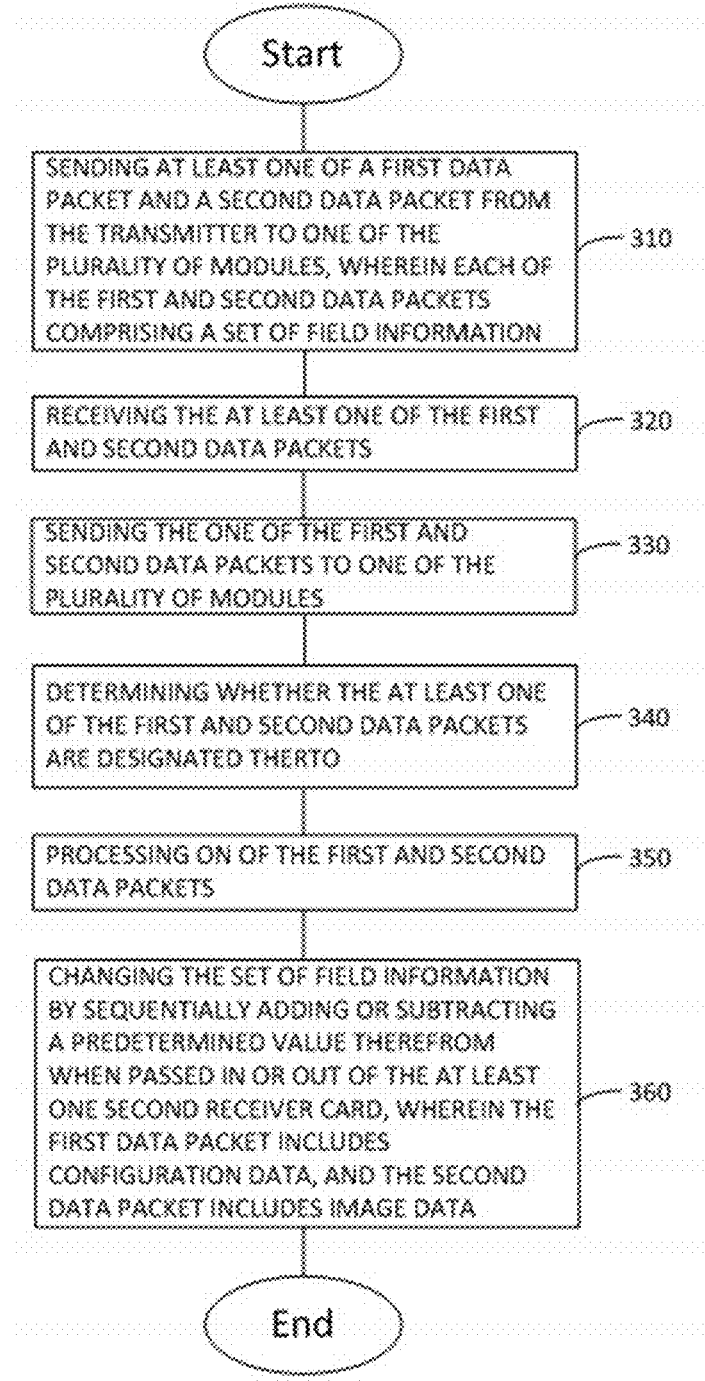
FIG. 16 is a schematic flowchart of the method for transmitting data packet using an LED display device that includes transmitter, at least one first receiver, and a plurality of second receiver modules.

FIG. 16 is a schematic flowchart of the method for transmitting data packet using an LED display device that includes transmitter 110, at least one first receiver 120, a plurality of second receiver modules.

Step 310 refers to a step of sending at least one of a configuration data packet and an image data packet from the transmitter 110 to one of the plurality of second receiver modules. Each of the configuration and image data packets includes a set of field information. Step 320 refers to a step of receiving the at least one of the configuration and image data packets. Step 330 refers to a step of sending one of the configuration and image data packets to one of the plurality of modules. Step 340 refers to a step of determining whether the at least one of the configuration and image data packets are designated thereto. Step 350 refers to a step of processing one of the configuration and image data packets. Step 360 refers to a step of changing the set of field information by sequentially adding or subtracting a predetermined value therefrom when entering or exiting the at least one second receiver. The configuration data packet includes configuration data while the image data packet includes image data.

It is to be understood that the exemplary embodiments described herein are that for presently preferred embodiments and are not limiting. Descriptions of features or aspects within each embodiment should typically be considered as available for other similar features or aspects in other embodiments.

What is claimed is:

1. A LED display device comprising:
   a transmitter;
   a plurality of first receivers coupled to the transmitter;
   a plurality of second receiver modules, wherein each of the second receiver modules is coupled to at least one of the plurality of first receivers and comprises a plurality of second receivers;
   a plurality of LED driver groups, each of the LED driver groups coupled to at least one of the second receivers and comprising a plurality of LED drivers; and
   a transformerless wire link connecting one of the plurality of first receivers to one of the plurality of second receiver modules to transmit data therebetween.

2. The LED display device of claim 1, wherein the transformerless wire link is a serializer/deserializer (SerDes) link.

3. The LED display device of claim 1, wherein the transformerless wire link does not include a transformer.

4. The LED display device of claim 1, wherein each of the plurality of second receivers includes a phase-locked loop (PLL).

5. The LED display device of claim 1, wherein each of the plurality of second receivers does not include a transformer.

6. The LED display device of claim 1, wherein a distance between the plurality of first receivers and the plurality of second receiver modules is less than 4 m.

7. The LED display device of claim 1, wherein a distance between the adjacent receivers of the plurality of second receivers is less than 4 m.

8. The LED display device of claim 1, wherein the transmitter is connected to the plurality of first receivers via a Gigabit Ethernet PHY (GPHY).

9. The LED display device of claim 1, wherein adjacent second receivers in one or more of the plurality of second receiver modules are connected via a serializer/deserializer (SerDes) link.

10. A method of operating a LED display device, the method comprising:
    transmitting data from a transmitter to a plurality of first receivers;
    transmitting the data from one of the plurality of first receivers to one of a plurality of second receiver modules via a transformerless wire link,
    wherein each of the plurality of second receiver modules comprises a plurality of second receivers; and
    transmitting the data from the plurality of second receiver modules to a plurality of LED driver groups, each of the LED driver groups coupled to at least one of the second receivers and comprising a plurality of LED drivers.

11. The method of claim 10, wherein the transformerless wire link is a serializer/deserializer (SerDes) link.

12. The method of claim 10, wherein the transformerless wire link does not include a transformer.

13. The method of claim 10, wherein each of the plurality of second receivers includes a phase-locked loop (PLL).

14. The method of claim 10, wherein each of the plurality of second receivers does not include a transformer.

15. The method of claim 10, wherein a distance between the plurality of first receivers and the plurality of second receiver modules is less than 4m.

16. The method of claim 10, wherein a distance between the adjacent receivers of the plurality of second receivers is less than 4m.

17. The method of claim 10, wherein the transmitter is connected to the plurality of first receivers via a Gigabit Ethernet PHY (GPHY).

18. The method of claim 10, further comprising: transmitting the data received from the first receiver between two adjacent second receivers in one of the plurality of second receiver modules via a serializer/deserializer (SerDes) link.

* * * * *